United States Patent
Fakoorian et al.

(10) Patent No.: US 11,729,801 B2
(45) Date of Patent: Aug. 15, 2023

(54) DYNAMIC HARQ-ACK CODEBOOK CONSTRUCTION FOR MULTIPLE ACTIVE SEMI-PERSISTENT SCHEDULING CONFIGURATIONS

(71) Applicant: QUALCOMM Incorporated, San Diego, CA (US)

(72) Inventors: Seyed Ali Akbar Fakoorian, San Diego, CA (US); Peter Gaal, San Diego, CA (US); Wanshi Chen, San Diego, CA (US); Seyedkianoush Hosseini, San Diego, CA (US); Wei Yang, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 16/947,690

(22) Filed: Aug. 12, 2020

(65) Prior Publication Data

US 2021/0051665 A1    Feb. 18, 2021

Related U.S. Application Data

(60) Provisional application No. 62/888,177, filed on Aug. 16, 2019.

(51) Int. Cl.
*H04L 5/00* (2006.01)
*H04W 72/53* (2023.01)
(Continued)

(52) U.S. Cl.
CPC .......... *H04W 72/53* (2023.01); *H04B 7/0456* (2013.01); *H04L 1/1819* (2013.01);
(Continued)

(58) Field of Classification Search
CPC .............. H04W 72/0493; H04W 72/04; H04L 5/0055; H04L 5/00
See application file for complete search history.

(56) References Cited

U.S. PATENT DOCUMENTS

| 2013/0223300 A1 | 8/2013 | Yang et al. |
| 2014/0050176 A1* | 2/2014 | Lin ..................... H04W 74/002 370/329 |

(Continued)

FOREIGN PATENT DOCUMENTS

| EP | 2709299 A2 | 3/2014 |
| EP | 3349387 A1 | 7/2018 |

(Continued)

OTHER PUBLICATIONS

International Search Report and Written Opinion—PCT/US2020/046163—ISA/EPO—dated Jan. 26, 2021.

(Continued)

*Primary Examiner* — Abdelillah Elmejjarmi
(74) *Attorney, Agent, or Firm* — Harrity & Harrity, LLP

(57) ABSTRACT

Various aspects of the present disclosure generally relate to wireless communication. In some aspects, a user equipment (UE) may receive activation or reactivation downlink control information (DCI) for a semi-persistent scheduling (SPS) configuration, wherein the activation or reactivation DCI includes a downlink association index (DAI) that is incremented by: a value of one to represent an initial SPS communication associated with the SPS configuration, or a value equal to a number of SPS occasions that are multiplexed in a same physical uplink control channel (PUCCH) communication. The UE may transmit acknowledgement or negative acknowledgement (ACK/NACK) feedback in the PUCCH communication based at least in part on the DAI. Numerous other aspects are provided.

30 Claims, 15 Drawing Sheets

(51) Int. Cl.
　　　*H04B 7/0456*　　(2017.01)
　　　*H04W 76/30*　　(2018.01)
　　　*H04L 1/1812*　　(2023.01)
　　　*H04W 72/23*　　(2023.01)
(52) U.S. Cl.
　　　CPC ........... *H04L 5/0055* (2013.01); *H04W 72/23* (2023.01); *H04W 76/30* (2018.02)

(56) References Cited

U.S. PATENT DOCUMENTS

2020/0313809 A1\* 10/2020 Park ............... H04L 5/0023
2021/0037516 A1\*  2/2021 Lyu ............... H04L 1/1854
2022/0191900 A1\*  6/2022 Takeda ........... H04L 1/1854

FOREIGN PATENT DOCUMENTS

| JP | WO2020188815 A1 \* |  9/2020 | ............ H04W 72/04 |
| JP | 3952509 A1 \* |  2/2022 | ............ H04W 72/04 |
| WO | WO2020223195 A1 \* | 11/2020 | ............... H04L 1/16 |

OTHER PUBLICATIONS

Partial International Search Report—PCT/US2020/046163—ISA/EPO—dated Nov. 19, 2020.

\* cited by examiner

US 11,729,801 B2

DYNAMIC HARQ-ACK CODEBOOK CONSTRUCTION FOR MULTIPLE ACTIVE SEMI-PERSISTENT SCHEDULING CONFIGURATIONS

CROSS-REFERENCE TO RELATED APPLICATION

This patent application claims priority to U.S. Provisional Patent Application No. 62/888,177, filed on Aug. 16, 2019, entitled "DYNAMIC HARQ-ACK CODEBOOK CONSTRUCTION FOR MULTIPLE ACTIVE SEMI-PERSISTENT SCHEDULING CONFIGURATIONS," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for dynamic hybrid automatic repeat request acknowledgement (HARQ-ACK) codebook construction for multiple active semi-persistent scheduling configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes: receiving activation or reactivation downlink control information (DCI) for a semi-persistent scheduling (SPS) configuration, wherein the activation or reactivation DCI includes a downlink association index (DAI) that is incremented by: a value of one to represent an initial SPS communication associated with the SPS configuration, or a value equal to a number of SPS occasions that are multiplexed in a same physical uplink control channel (PUCCH) communication; and transmitting acknowledgement or negative acknowledgement (ACK/NACK) feedback in the PUCCH communication based at least in part on the DAI.

In some aspects, a method of wireless communication performed by a base station includes: transmitting, to a UE, activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication; and receiving ACK/NACK feedback in the PUCCH communication based at least in part on the DAI.

In some aspects, a UE for wireless communication includes: a memory; and one or more processors operatively coupled to the memory, the memory and the one or more processors configured to: receive activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication; and transmit ACK/NACK feedback in the PUCCH communication based at least in part on the DAI.

In some aspects, a base station for wireless communication includes: a memory; and one or more processors operatively coupled to the memory, the memory and the one or more processors configured to: transmit, to a UE, activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication; and receive ACK/NACK feedback in the PUCCH communication based at least in part on the DAI.

In some aspects, a non-transitory computer-readable medium storing a set of instructions for wireless communication includes: one or more instructions that, when executed by one or more processors of a UE, cause the UE to: receive activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication; and transmit ACK/NACK feedback in the PUCCH communication based at least in part on the DAI.

In some aspects, a non-transitory computer-readable medium storing a set of instructions for wireless communication includes: one or more instructions that, when executed by one or more processors of a base station, cause the base station to: transmit, to a UE, activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication; and receive ACK/NACK feedback in the PUCCH communication based at least in part on the DAI.

In some aspects, an apparatus for wireless communication includes: means for receiving activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication; and means for transmitting ACK/NACK feedback in the PUCCH communication based at least in part on the DAI.

In some aspects, an apparatus for wireless communication includes: means for transmitting, to a UE, activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication; and means for receiving ACK/NACK feedback in the PUCCH communication based at least in part on the DAI.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
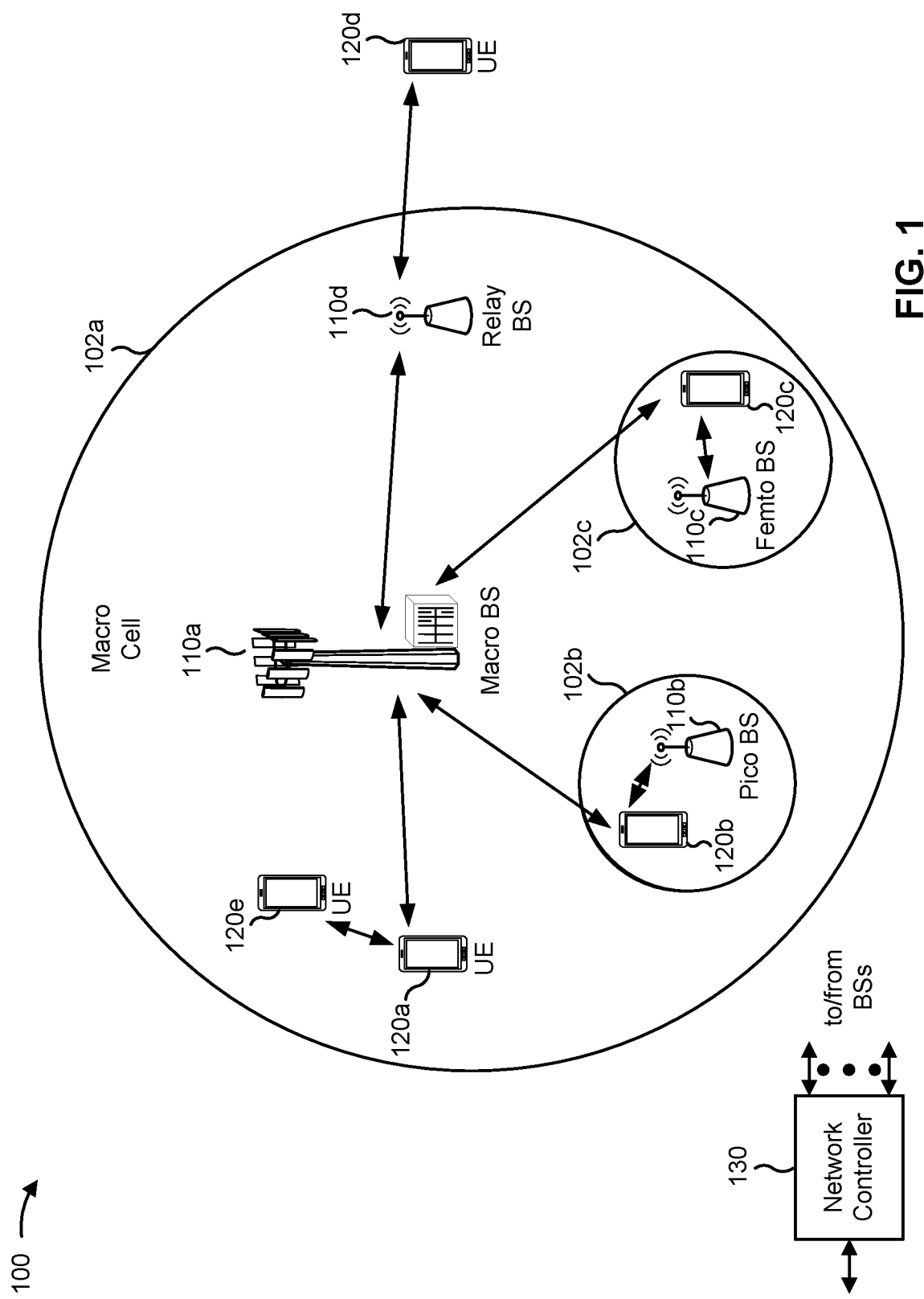
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
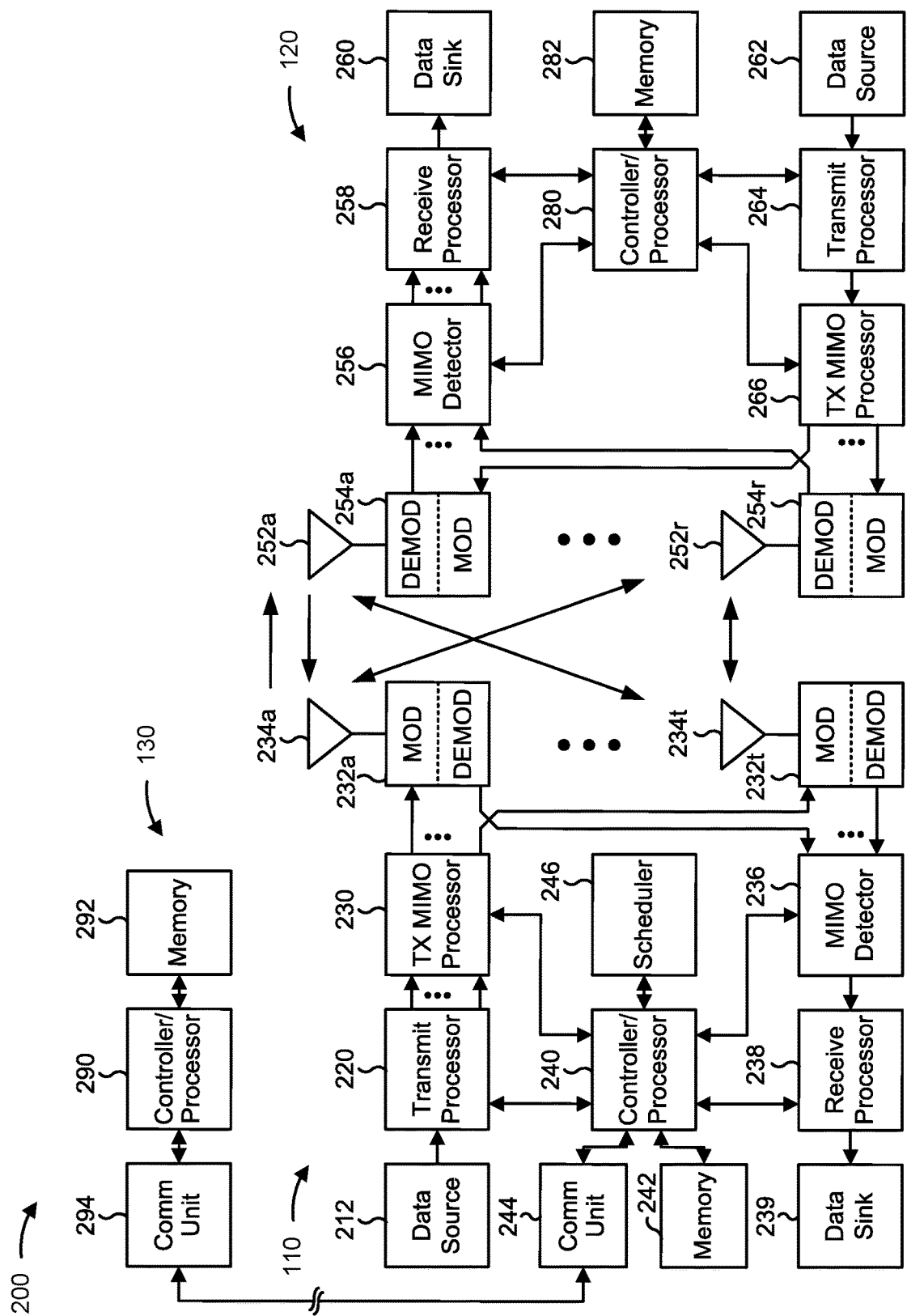
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dynamic HARQ-ACK codebook construction for multiple active semi-persistent scheduling configurations, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and/or other processes as described herein. A scheduler 246 may schedule UEs for data transmission on the downlink and/or uplink.

In some aspects, the UE 120 may include means for receiving activation or reactivation DCI for an SPS configuration, wherein the activation or reactivation DCI includes a DAI field that is incremented by a number of SPS occasions of the SPS configuration that are multiplexed in a same PUCCH communication; means for transmitting ACK/NACK feedback, for the number of SPS occasions, in the PUCCH communication; and/or the like. Additionally, or alternatively, the UE 120 may include means for receiving activation or reactivation DCI for an SPS configuration, wherein the activation or reactivation DCI indicates a PUCCH resource to be used to transmit ACK/NACK feedback for an initial SPS occasion of the SPS configuration, wherein the ACK/NACK feedback for the initial SPS occasion is not permitted to be multiplexed in a Type 2 HARQ-ACK codebook; means for transmitting the ACK/NACK feedback, for the initial SPS occasion, in the PUCCH resource; and/or the like. Additionally, or alternatively, the UE 120 may include means for receiving activation or reactivation DCI for an SPS configuration, wherein the UE is operating in an SPS-only mode and the activation or reactivation DCI includes a DAI that is incremented by either: a value of one to represent an initial SPS communication associated with the SPS configuration, or a value equal to a number of SPS occasions that are multiplexed in a same PUCCH communication regardless of an SPS configuration to which the number of SPS occasions belong; means for transmitting ACK/NACK feedback based at least in part on the DAI; and/or the like. In some aspects, such means may include one or more components of UE 120 described in connection with FIG. 2, such as controller/ processor 280, transmit processor 264, TX MIMO processor 266, MOD 254, antenna 252, DEMOD 254, MIMO detector 256, receive processor 258, and/or the like.

In some aspects, the base station 110 may include means for transmitting activation or reactivation DCI for an SPS configuration, wherein the activation or reactivation DCI includes a DAI field that is incremented by a number of SPS occasions of the SPS configuration that are multiplexed in a same PUCCH communication; means for receiving ACK/NACK feedback, for the number of SPS occasions, in the PUCCH communication; and/or the like. Additionally, or alternatively, the base station 110 may include means for transmitting activation or reactivation DCI for an SPS configuration, wherein the activation or reactivation DCI indicates a PUCCH resource to be used to transmit ACK/NACK feedback for an initial SPS occasion of the SPS configuration, wherein the ACK/NACK feedback for the initial SPS occasion is not permitted to be multiplexed in a Type 2 HARQ-ACK codebook; means for receiving the ACK/NACK feedback, for the initial SPS occasion, in the PUCCH resource; and/or the like. Additionally, or alternatively, the base station 110 may include means for transmitting activation or reactivation DCI for an SPS configuration for a UE 120 operating in an SPS-only mode, wherein the activation or reactivation DCI includes a DAI that is incremented by either: a value of one to represent an initial SPS communication associated with the SPS configuration, or a value equal to a number of SPS occasions that are multiplexed in a same PUCCH communication regardless of an SPS configuration to which the number of SPS occasions belong; means for receiving ACK/NACK feedback based at least in part on the DAI; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, the UE 120 includes means for receiving activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication; and/or means for transmitting ACK/NACK feedback in the PUCCH communication based at least in part on the DAI. In some aspects, the UE includes means for determining to multiplex the number of SPS occasions of the SPS configuration in the PUCCH communication based at least in part on an indication, in the activation or reactivation DCI or the SPS configuration, of the number of SPS occasions for which ACK/NACK feedback is to be multiplexed. Such means may include, for example, antenna 252, demodulator 254, MIMO detector 256, receive processor 258, transmit processor 264, TX MIMO processor 266, modulator 254, controller/processor 280, and/or memory 282.

In some aspects, the base station includes means for transmitting, to a UE, activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication; and/or means for receiving ACK/NACK feedback in the PUCCH communication based at least in part on the DAI. Such means may include, for example, transmit processor 220, TX MIMO processor 230, modulator 232, antenna 234, demodulator 232, MIMO detector 236, receive processor 238, controller/processor 240, memory 242, and/or scheduler 246.

As indicated above, FIG. 2 is provided as an example. Other examples may differ from what is described with regard to FIG. 2.

Figure 3:
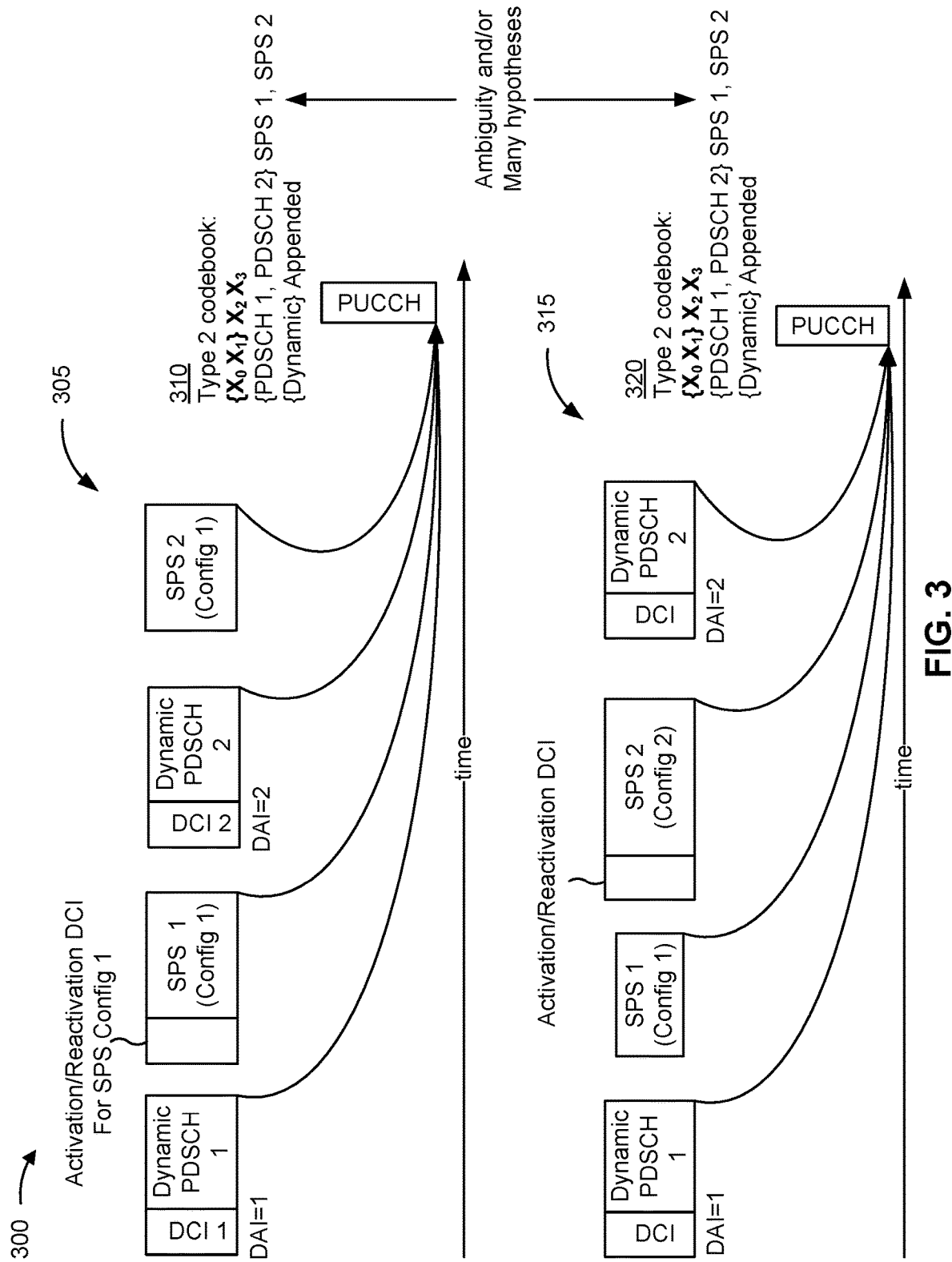
FIG. 3 is a diagram illustrating an example of appending semi-persistent scheduling HARQ-ACK feedback to a dynamic HARQ-ACK codebook, in accordance with various aspects of the present disclosure.

FIG. 3 is a diagram illustrating an example 300 of appending semi-persistent scheduling HARQ-ACK feedback to a dynamic HARQ-ACK codebook, in accordance with various aspects of the present disclosure.

In New Radio (NR), semi-persistent scheduling (SPS) may be used to reduce signaling overhead and latency for downlink communications (e.g., downlink data communications, physical downlink shared channel (PDSCH) communications, and/or the like). Using SPS, a base station may transmit an SPS configuration to a UE, such as in a radio resource control (RRC) message. The SPS configuration may indicate a set of SPS resources to be used for SPS communications (e.g., downlink communications, as indicated above), such as a set of time resources, a set of frequency resources, and/or the like. For example, the SPS configuration may indicate a periodicity of SPS communications, and the periodicity may indicate the set of time resources allocated for the SPS communications. The UE may begin monitoring for SPS communications upon reception of activation downlink control information (DCI) (or reactivation DCI) from the base station. The activation DCI (or reactivation DCI) may activate an SPS configuration, in which case the SPS configuration is referred to as an active SPS configuration. The base station may later deactivate SPS communications of the SPS configuration using deactivation DCI, and the UE may refrain from monitoring for SPS communications of the SPS configuration upon receiving the deactivation DCI (e.g., until reactivation DCI is received for the SPS configuration).

In legacy wireless communication systems, there may be a limit of one active SPS configuration for a UE. Furthermore, an SPS configuration may have a minimum periodicity of 10 milliseconds. However, performance of the wireless communication system may be improved by permitting multiple active SPS configurations, such as for different time-sensitive network traffic flows, different services types (e.g., an ultra-reliable low latency communication (URLLC) service type, an enhanced mobile broadband (eMBB) service type, and/or the like), different types of downlink communications having different characteristics and/or different quality of service (QoS) requirements, and/or the like. In some cases, different SPS configurations may configure SPS communications with different periodicities, which may include a periodicity that is less than 10 milliseconds (e.g., to support URLLC QoS requirements). Furthermore, cross-carrier SPS scheduling may be used, where activation DCI transmitted via a first carrier (e.g., a primary carrier or primary cell) is used to activate SPS communications on a second carrier (e.g., a secondary carrier or secondary cell).

In some cases, a UE may be configured to report HARQ-ACK feedback in a Type 2 HARQ-ACK codebook. As used herein, HARQ-ACK may refer to hybrid automatic repeat request (HARQ) acknowledgement (ACK). HARQ-ACK feedback may sometimes be referred to as acknowledgement (ACK) or negative acknowledgement (NACK) (collectively, ACK/NACK) feedback or ACK/NACK information. In a Type 2 HARQ-ACK codebook, also referred to as a dynamic HARQ-ACK codebook, the number of ACK/NACK bits reported by the UE may vary across different physical uplink control channel (PUCCH) resources in which HARQ-ACK feedback is reported (e.g., as opposed to a Type 1 HARQ-ACK codebook or a static HARQ-ACK codebook, in which the number of ACK/NACK bits reported by the UE is fixed across different PUCCH resources). To permit the UE to construct a Type 2 HARQ-ACK codebook, the base station may transmit a downlink association index (DAI) value (e.g., a cumulative DAI value and/or a total DAI value) in DCI. The DAI value may be incremented in each subsequent DCI, which indicates a count for the number of ACK/NACK bits to be indicated in a PUCCH resource and a position of each ACK/NACK bit corresponding to each PDSCH communication.

In a legacy wireless communication system, a single ACK/NACK bit corresponding to an SPS occasion may be appended to a dynamic HARQ-ACK codebook. In this case, the ACK/NACK feedback may include a dynamic HARQ-ACK codebook plus a single bit appended to the dynamic HARQ-ACK codebook for the SPS occasion. With a large SPS periodicity (e.g., 10 milliseconds or more), ACK/NACK feedback for multiple SPS communications may not need to be multiplexed in the same PUCCH resource. However, in a wireless communication system that permits multiple active SPS configurations, that permits short SPS periodicities (e.g., under 10 milliseconds) and/or different SPS periodicities for different active SPS configurations, and/or that permits cross-carrier SPS scheduling, HARQ-ACK feedback for multiple SPS occasions may be reported in the same physical uplink control channel (PUCCH) resource. In this case, appending an ACK/NACK bit for an initial (e.g., newly-activated) SPS communication to the dynamic HARQ-ACK codebook may result in ACK/NACK ambiguity and/or may require the base station to test several decoding hypotheses, thereby wasting base station resources (e.g., memory resources, processing resources, and/or the like) and degrading network performance.

For example, as shown by reference number 305, the UE may multiplex ACK/NACK bits for a first dynamically-scheduled PDSCH communication (shown as PDSCH 1), a first SPS communication of an SPS configuration (shown as SPS 1 of Config 1), a second dynamically-scheduled PDSCH communication (shown as PDSCH 2), and a second SPS communication of the SPS configuration (shown as SPS 2 of Config 1) in the same PUCCH resource (e.g., PUCCH occasion). As shown, PDSCH 1 may be scheduled by DCI 1 that indicates a DAI value of 1, and PDSCH 2 may be scheduled by DCI 2 that indicates a DAI value of 2. As further shown, the SPS configuration may be activated (or reactivated) by an activation (or reactivation) DCI. In this example, SPS 1 is an initial SPS communication of the SPS configuration, meaning that SPS 1 is transmitted before any other SPS communications activated for the SPS configuration by the activation DCI (or the reactivation DCI) (e.g., SPS 1 is transmitted before SPS 2 and any other SPS of the SPS configuration).

As shown by reference number 310, when multiplexing the ACK/NACK bits, the UE may construct a Type 2 HARQ-ACK codebook based at least in part on the DAI values indicated in the DCI for the dynamically-scheduled PDSCH communications. Because of the DAI values, the UE includes two ACK/NACK bits in the Type 2 HARQ-ACK codebook, shown as $\{X_0\ X_1\}$, where $X_0$ corresponds to the ACK/NACK bit for PDSCH 1, and $X_1$ corresponds to the ACK/NACK bit for PDSCH 2. If the UE were to append the ACK/NACK bits corresponding to the SPS communications to the Type 2 HARQ-ACK codebook, then the UE would append two ACK/NACK bits to the Type 2 HARQ-ACK codebook, shown as $\{X_2\ X_3\}$, where $X_2$ corresponds to the ACK/NACK bit for SPS 1, and $X_3$ corresponds to the ACK/NACK bit for SPS 2. However, appending SPS ACK/NACK bits to a Type 2 HARQ-ACK codebook in this manner may result in ACK/NACK ambiguity and/or may require the base station to test several decoding hypotheses, thereby wasting base station resources (e.g., memory resources, processing resources, and/or the like) and degrading network performance, as described in more detail below.

As another separate example, as shown by reference number 315, the UE may multiplex ACK/NACK bits for a first dynamically-scheduled PDSCH communication (shown as PDSCH 1), a first SPS communication of a first SPS configuration (shown as SPS 1 of Config 1), a second SPS communication of a second SPS configuration (shown as SPS 2 of Config 2), and a second dynamically-scheduled PDSCH communication (shown as PDSCH 2) in the same PUCCH resource. As shown, PDSCH 1 may be scheduled by DCI 1 that indicates a DAI value of 1, and PDSCH 2 may be scheduled by DCI 2 that indicates a DAI value of 2. As further shown, the SPS configuration may be activated (or reactivated) by an activation (or reactivation) DCI. In this example, SPS 2 is an initial SPS communication of the second SPS configuration, while SPS 1 is not an initial SPS communication of the first SPS configuration.

As shown by reference number 320, when multiplexing the ACK/NACK bits, the UE may construct a Type 2 HARQ-ACK codebook based at least in part on the DAI values indicated in the DCI for the dynamically-scheduled PDSCH communications. As described above, because of the DAI values, the UE includes two ACK/NACK bits in the Type 2 HARQ-ACK codebook, shown as $\{X_0\ X_1\}$, where $X_0$ corresponds to the ACK/NACK bit for PDSCH 1, and $X_1$ corresponds to the ACK/NACK bit for PDSCH 2. If the UE were to append the ACK/NACK bits corresponding to the SPS communications to the Type 2 HARQ-ACK codebook, then the UE would append two ACK/NACK bits to the Type 2 HARQ-ACK codebook, shown as $\{X_2\ X_3\}$, where $X_2$ corresponds to the ACK/NACK bit for SPS 1, and $X_3$ corresponds to the ACK/NACK bit for SPS 2.

However, appending SPS ACK/NACK bits to a Type 2 HARQ-ACK codebook in this manner may result in ACK/NACK ambiguity and/or may require the base station to test several decoding hypotheses, thereby wasting base station resources (e.g., memory resources, processing resources, and/or the like) and degrading network performance, as described in more detail below. For example, the base station may not know how to interpret received ACK/NACK feedback and/or may need to test four or more hypotheses to determine how to interpret the received ACK/NACK feedback, thereby wasting resources. For example, if the UE fails to receive an activation DCI (or a reactivation DCI) for an SPS configuration (and thus misses one or more SPS communications scheduled by the activation or reactivation DCI), then there may be mis-match between ACK/NACK bits reported by the UE and expected ACK/NACK bits that the base station expects to receive. Some techniques and apparatuses described herein address these and other issues, resulting in reduced ACK/NACK ambiguity, conservation of base station resources due to testing fewer hypotheses, a reduced likelihood of a mis-match in ACK/NACK feedback between the UE and the base station, and/or the like.

As indicated above, FIG. 3 is provided as an example. Other examples may differ from what is described with regard to FIG. 3.

Figure 4:
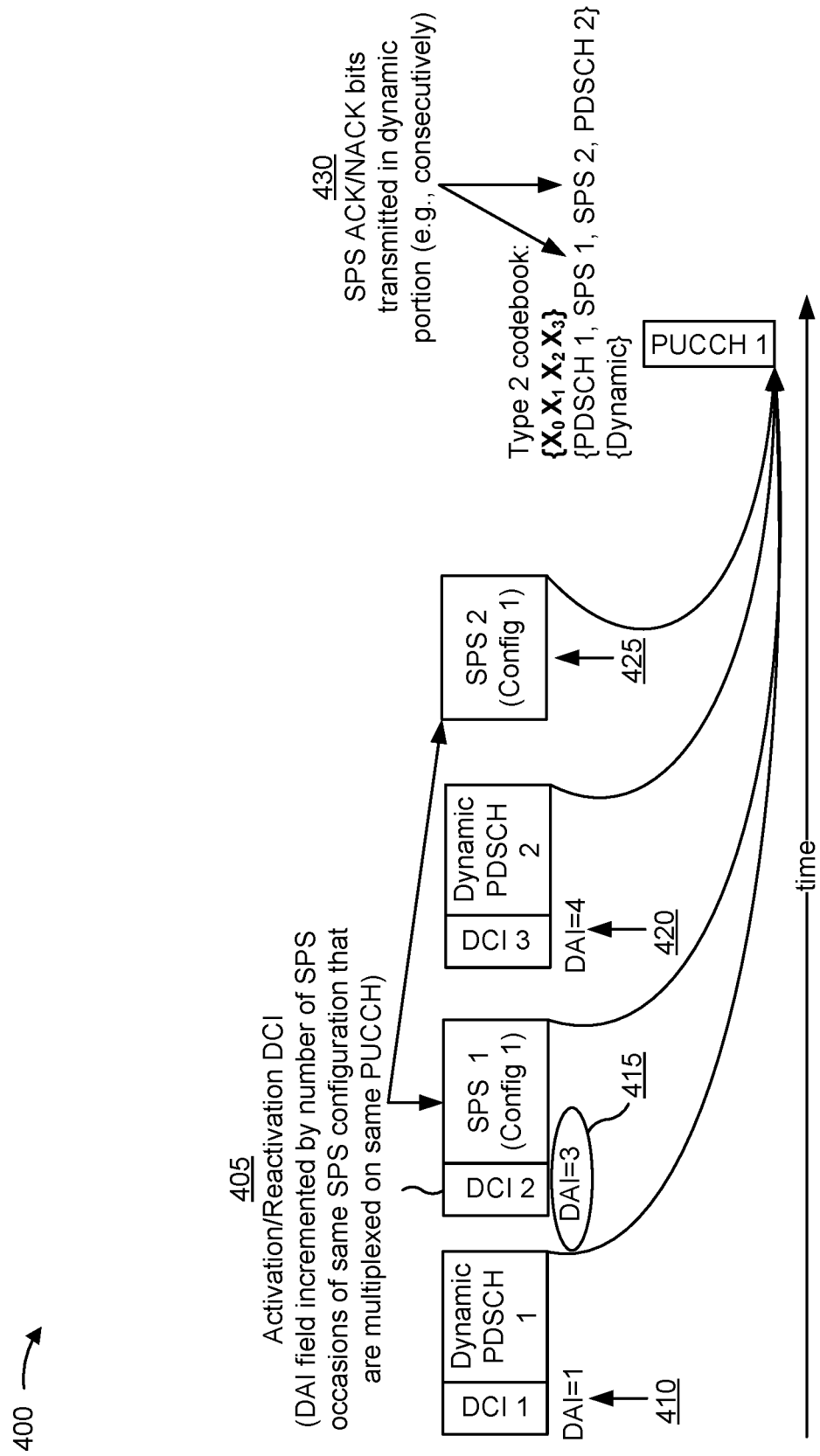
FIGS. 4-7 are diagrams illustrating examples of dynamic HARQ-ACK codebook construction for multiple active semi-persistent scheduling configurations, in accordance with various aspects of the present disclosure.

FIG. 4 is a diagram illustrating an example 400 of dynamic HARQ-ACK codebook construction for multiple active semi-persistent scheduling configurations, in accordance with various aspects of the present disclosure.

As shown by reference number 405, a UE 120 may receive (e.g., from a base station 110) activation DCI for an SPS configuration. The activation DCI may include a DAI field that is incremented by a number of SPS occasions of the SPS configuration that are multiplexed in a same PUCCH communication. Although some techniques are described herein in connection with activation DCI, these techniques apply equally to reactivation DCI.

For example, as shown by reference number 410, the UE 120 may receive, from a base station 110, a first DCI (shown as DCI 1) that schedules a first PDSCH communication (shown as PDSCH 1). The DAI in DCI 1 has a counter value of one. As shown by reference number 415, then UE 120 may later receive, from the base station 110, a second DCI (shown as DCI 2), which is activation or reactivation DCI for an SPS configuration. As shown, the DAI in DCI 2 has a counter value of three. In this example, the DAI counter value of DCI 2 is incremented by two (e.g., as compared to the DAI counter value of DCI 1 with a value of one) because there are two SPS occasions of the SPS configuration activated by DCI 2 that are multiplexed in the same PUCCH communication (shown as PUCCH 1). Thus, the DAI field in the activation DCI indicates that two SPS occasions of the SPS configuration are multiplexed in the same PUCCH communication because the DAI field is incremented by two as compared to the prior DCI (DCI 1).

In example 400, SPS 1 and SPS 2 belong to the same SPS configuration, are both activated by the activation DCI (DCI 2), and are both multiplexed in the same PUCCH communication (PUCCH 1). Furthermore, SPS 1 is an initial SPS occasion of the SPS configuration and SPS 2 is not an initial SPS occasion of the SPS configuration. In other words, SPS 1 occurs earliest in time among all SPS occasions of the SPS configuration that are activated by DCI 2, and SPS 2 does not occur earliest in time among all SPS occasions of the SPS configuration that are activated by DCI 2 (e.g., because SPS 1 occurs earlier than SPS 2).

As shown by reference number 420, the UE 120 may later receive, from the base station 110, a third DCI (shown as DCI 3) that schedules a second PDSCH communication (shown as PDSCH 2). The DAI in DCI 3 has a counter value of four. As shown by reference number 425, the UE 120 may later monitor for SPS 2 according to the SPS configuration.

As shown by reference number 430, the UE 120 may transmit, to the base station 110, ACK/NACK feedback in the PUCCH communication. The ACK/NACK feedback may include ACK/NACK feedback for the number of SPS occasions. For example, the UE 120 may construct a Type 2 HARQ-ACK codebook by including the ACK/NACK bits for the initial SPS occasion and any other SPS occasions that belong to the same SPS configuration as the initial SPS occasion and that are multiplexed in the same PUCCH communication as the initial SPS occasion. As further shown, in some aspects, the UE 120 may transmit the ACK/NACK bits for the number of SPS occasions consecutively (e.g., as consecutive bits in the Type 2 HARQ-ACK codebook). In some cases, an ACK/NACK bit for a subsequent SPS occasion (e.g., that occurs after the initial SPS occasion) may belong to the same SPS configuration as the initial SPS occasion, but may not be multiplexed with an ACK/NACK bit for the initial SPS occasion. In these cases, the ACK/NACK bit for the subsequent SPS occasion may be appended to the Type 2 HARQ-ACK codebook rather than being included in the Type 2 HARQ-ACK codebook (e.g., rather than being included in a dynamic portion of the Type 2 HARQ-ACK codebook), as described in more detail below in connection with FIG. 5.

In example 400, because of the DAI values, the UE 120 includes four ACK/NACK bits in the Type 2 HARQ-ACK codebook, shown as $\{X_0\ X_1\ X_2\ X_3\}$, where $X_0$ corresponds to the ACK/NACK bit for PDSCH 1, $X_1$ corresponds to the ACK/NACK bit for SPS 1, $X_2$ corresponds to the ACK/NACK bit for SPS 2, and $X_3$ corresponds to the ACK/NACK bit for PDSCH 2. In this case, there is a direct correspondence between reported ACK/NACK bits and PDSCH or SPS communications, without any ambiguity that may be caused by appending ACK/NACK bits for an initial SPS occasion and/or any other SPS occasions that belong to the same SPS configuration as the initial SPS occasion.

For example, if the UE 120 successfully receives all communications, then the UE 120 would report $\{1, 1, 1, 1\}$. If the UE 120 misses the activation DCI, then the UE 120 would report $\{1, 0, 0, 1\}$ because the UE 120 would determine that two transmissions were missed due to the DAI value of 1 in DCI 1 and the DAI value of 4 in DCI 3, which indicates to the base station that the activation DCI was missed. In this case, the base station 110 may retransmit the activation DCI and any corresponding SPS communications. However, if the UE 120 reports $\{1, 1, 0, 1\}$, then this may indicate that SPS 2 was missed but that the activation DCI was received. Thus, the base station 110 may retransmit SPS 2 (e.g., without retransmitting the activation DCI). If the UE 120 were to instead append SPS ACK/NACK bits to the Type 2 HARQ-ACK codebook (e.g., as described above in connection with FIG. 3), then the base station 110 may need to test multiple decoding hypotheses to determine whether reported ACK/NACK feedback corresponds to, for example, $\{1\ 1\}$ or $\{1\ 1\}\ 1\ 1$ or $\{1\ 1\}\ 1\ 0$ or $\{1\ 1\}\ 0\ 0$.

When ACK/NACK bits for multiple SPS occasions are multiplexed in the same PUCCH communication, different SPS occasions may need to be associated with different PDSCH-to-PUCCH timing values (sometimes referred to as a K1 value). A PDSCH-to-PUCCH timing value may indicate the number of transmission time intervals (TTIs) (e.g., slots, subframes, symbols, and/or the like) from reception of a PDSCH communication (in this case, an SPS communication) to transmission of a PUCCH communication that includes ACK/NACK feedback for the PDSCH communication. In example 400, if SPS 1 is scheduled in slot two, SPS 2 is scheduled in slot four, and PUCCH 1 is scheduled in slot six, then the K1 value for SPS 1 is four and the K1 value for SPS 2 is two. In some cases, an SPS configuration may indicate a K1 value to be used for SPS communications of the SPS configuration. However, this fails to account for the possibility of using different K1 values for different SPS communications.

Thus, in some aspects, the SPS configuration (or the activation DCI) may instruct the UE 120 to multiplex ACK/NACK feedback for multiple SPS occasions in a single PUCCH communication. For example, the SPS configuration (or the activation DCI) may indicate the number of SPS occasions for which ACK/NACK feedback is to be multiplexed in the same PUCCH communication. In example 400, the number of SPS occasions is two. Additionally, or alternatively, the activation DCI may indicate a single K1 value, and the UE 120 may apply that single K1 value to either an earliest-occurring SPS occasion or to a latest-occurring SPS occasion to determine a PUCCH resource for transmission of ACK/NACK feedback for both the earliest-occurring SPS occasion and the latest-occurring SPS occasion. In some aspects, the SPS configuration may indicate whether to count K1 from the earliest-occurring SPS occasion (e.g., the initial SPS communication) or from the latest-occurring SPS occasion.

For example, if SPS 1 is scheduled in slot two, SPS 2 is scheduled in slot four, and the UE 120 applies a K1 value of four to the earliest-occurring SPS occasion, then the UE 120 would determine that ACK/NACK feedback for SPS 1 and SPS 2 is to be multiplexed in a PUCCH communication in slot six. As another example, if SPS 1 is scheduled in slot two, SPS 2 is scheduled in slot four, and the UE 120 applies a K1 value of four to the latest-occurring SPS occasion, then the UE 120 would determine that ACK/NACK feedback for SPS 1 and SPS 2 is to be multiplexed in a PUCCH communication in slot eight. In some aspects, the UE 120 may be configured or instructed to count K1 from the latest-occurring SPS occasion to reduce a number of bits needed to indicate K1 and therefore reduce signaling overhead.

In some aspects, there may be a maximum limit to the number of SPS occasions for which ACK/NACK feedback is permitted to be multiplexed in the same PUCCH communication (e.g., a maximum of two). In some aspects, the base station 110 may indicate the maximum limit to the UE 120 and/or may refrain from configuring and/or scheduling downlink communications (e.g., SPS communications) that would exceed the maximum limit. For example, the base station 110 may configure the UE 120 with a maximum limit using an RRC message. In this way, some multiplexed ACK/NACK bits can be reserved for dynamic PDSCH communications.

In some cases, the activation DCI may be used for cross-carrier scheduling. In this case, activation DCI that is carried on a first carrier (e.g., a primary carrier or primary cell) may be used to activate SPS communications on a second carrier (e.g., a secondary carrier or secondary cell). In this case, the activation DCI for SPS may have DCI format 1_1, which supports cross-carrier scheduling. Similarly, deactivation DCI for SPS release may have DCI format 1_1 to support cross-carrier scheduling. In this way, cross-carrier SPS scheduling may be supported. Thus, activation DCI (or reactivation DCI) and deactivation DCI (for SPS release) may be received via a first cell or a first carrier, and may activate, reactivate, or deactivate SPS communications (configured according to the SPS configuration) for a second cell or a second carrier.

As indicated above, FIG. 4 is provided as an example. Other examples may differ from what is described with regard to FIG. 4.

Figure 5:
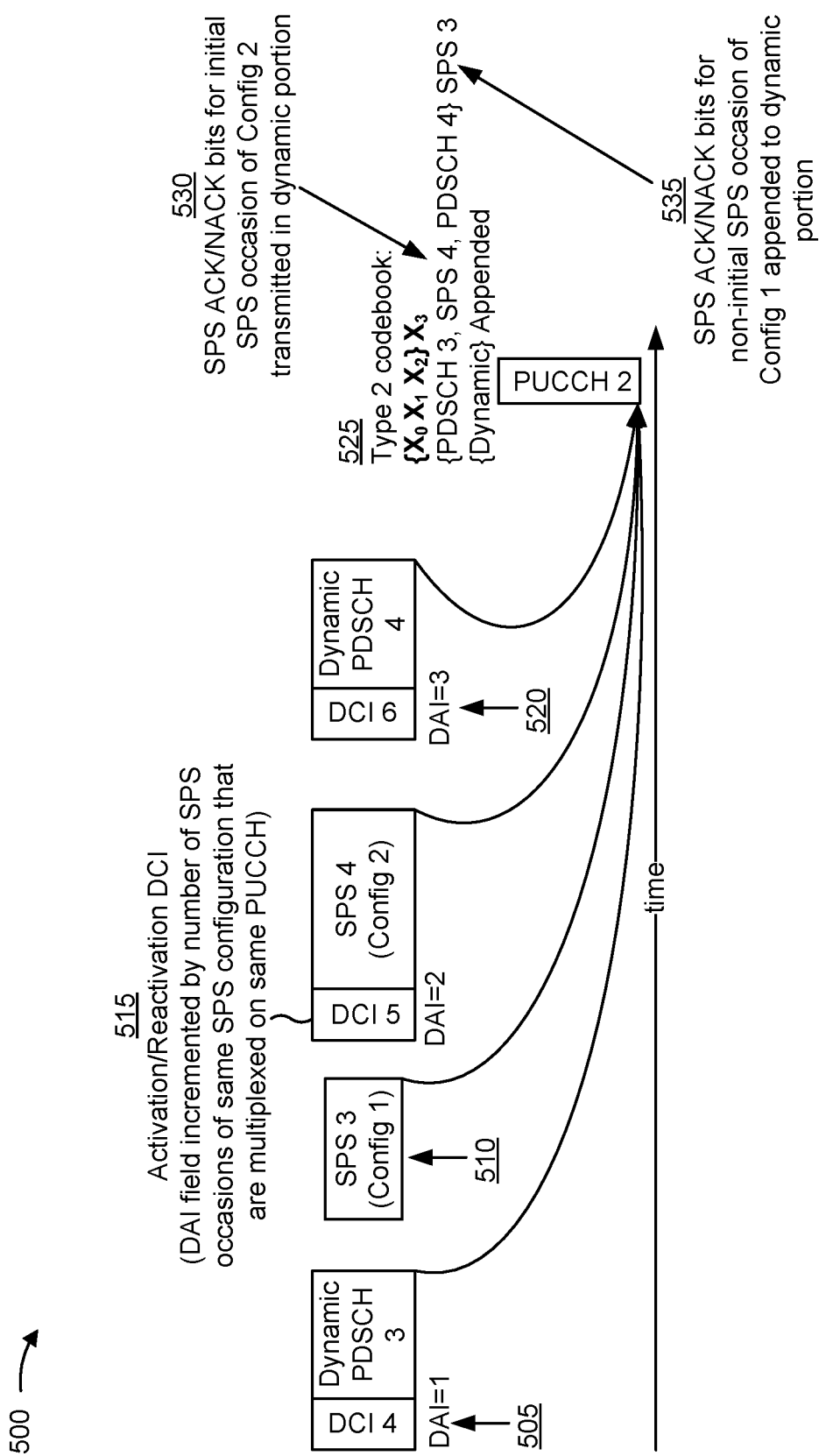

FIG. 5 is a diagram illustrating an example 500 of dynamic HARQ-ACK codebook construction for multiple active semi-persistent scheduling configurations, in accordance with various aspects of the present disclosure.

For the purposes of FIG. 5, assume that the operations described above in connection with FIG. 4 have been performed. That is, assume that a UE 120 has received DCI 1 that schedules PDSCH 1, DCI 2 that activates a first SPS configuration (Config 1), and DCI 3 that schedules PDSCH 2. Further assume that the UE 120 multiplexes ACK/NACK feedback for the number of SPS occasions in PUCCH 1, as described above.

As shown by reference number 505, the UE 120 may later receive DCI 4 that schedules PDSCH 3. The DAI in DCI 4 has a counter value of one. As shown by reference number 510, the UE 120 may monitor for SPS 3 that belongs to the first SPS configuration. Thus, SPS 3 belongs to the same SPS configuration as SPS 1 and SPS 2 of FIG. 4, but ACK/NACK feedback for SPS 3 is not multiplexed in the same PUCCH communication as SPS 1 and SPS 2. In this case, an ACK/NACK bit for SPS 3 is appended to the Type 2 HARQ-ACK codebook, as will be described below.

As shown by reference number 515, the UE 120 may receive DCI 5, which is activation DCI for a second SPS configuration (shown as Config 2). As described above, the activation DCI may include a DAI field that is incremented by a number of SPS occasions of the SPS configuration that are multiplexed in a same PUCCH communication. As shown, the DAI in DCI 5 has a counter value of two. In this example, the DAI counter value of DCI 5 is incremented by one (e.g., as compared to the DAI counter value of DCI 4 with a value of one) because there is only one SPS occasion of the SPS configuration activated by DCI 5 and multiplexed in the same PUCCH communication (shown as PUCCH 2). Thus, the DAI field in the activation DCI indicates that a single SPS occasions of the SPS configuration is multiplexed in the PUCCH communication because the DAI field is incremented by one as compared to the prior DCI (DCI 4). In example 500, SPS 4 is an initial SPS occasion of the second SPS configuration. As shown by reference number 520, the UE 120 may later receive DCI 6 that schedules PDSCH 4. The DAI in DCI 6 has a counter value of three.

As shown by reference number 525, the UE 120 may transmit, to the base station 110, ACK/NACK feedback in the PUCCH communication (e.g., PUCCH 2, which is subsequent to PUCCH 1 of FIG. 4 because PUCCH 2 occurs later in time than PUCCH 1). The ACK/NACK feedback may include ACK/NACK feedback for the number of SPS occasions. For example, the UE 120 may construct a Type 2 HARQ-ACK codebook by including the ACK/NACK bits for the initial SPS occasion and any other SPS occasions that belong to the same SPS configuration as the initial SPS occasion and that are multiplexed in the same PUCCH communication as the initial SPS occasion.

For example, as shown by reference number 530, the UE 120 may include, in the Type 2 HARQ-ACK codebook (e.g., a dynamic portion of the Type 2 HARQ-ACK codebook), ACK/NACK bits for the initial SPS occasion and any other SPS occasions that belong to the same SPS configuration as the initial SPS occasion and that are multiplexed in the same PUCCH communication as the initial SPS occasion. In example 500, only the ACK/NACK bits for the initial SPS occasion (SPS 4) of the second SPS configuration are included in the dynamic portion of the Type 2 HARQ-ACK codebook because the DAI value in DCI 6 indicates that only ACK/NACK feedback for SPS 4 is to be included in the dynamic portion of the Type 2 HARQ-ACK codebook.

As shown by reference number 535, because SPS 3 is not multiplexed in the same PUCCH communication as the initial SPS occasion (SPS 1) of the same SPS configuration as SPS 3, the ACK/NACK bit for SPS 3 is appended to the Type 2 HARQ-ACK codebook (e.g., the dynamic portion of the Type 2 HARQ-ACK codebook).

In example 500, because of the DAI values, the UE 120 includes three ACK/NACK bits in the Type 2 HARQ-ACK codebook, shown as $\{X_0\ X_1\ X_2\}$, where $X_0$ corresponds to the ACK/NACK bit for PDSCH 3, $X_1$ corresponds to the ACK/NACK bit for SPS 4, and $X_2$ corresponds to the ACK/NACK bit for PDSCH 4. As further shown, a single ACK/NACK bit, shown as $X_3$, is appended to the Type 2 HARQ-ACK codebook, where $X_3$ corresponds to the ACK/NACK bit for SPS 3. Because the UE 120 has already received and acknowledged the activation DCI for the first SPS configuration to which SPS 3 belongs, appending the ACK/NACK bit for SPS 3 does not introduce ambiguity or excessive decoding hypothesis testing by the base station 110.

As indicated above, FIG. 5 is provided as an example. Other examples may differ from what is described with regard to FIG. 5.

Figure 6:
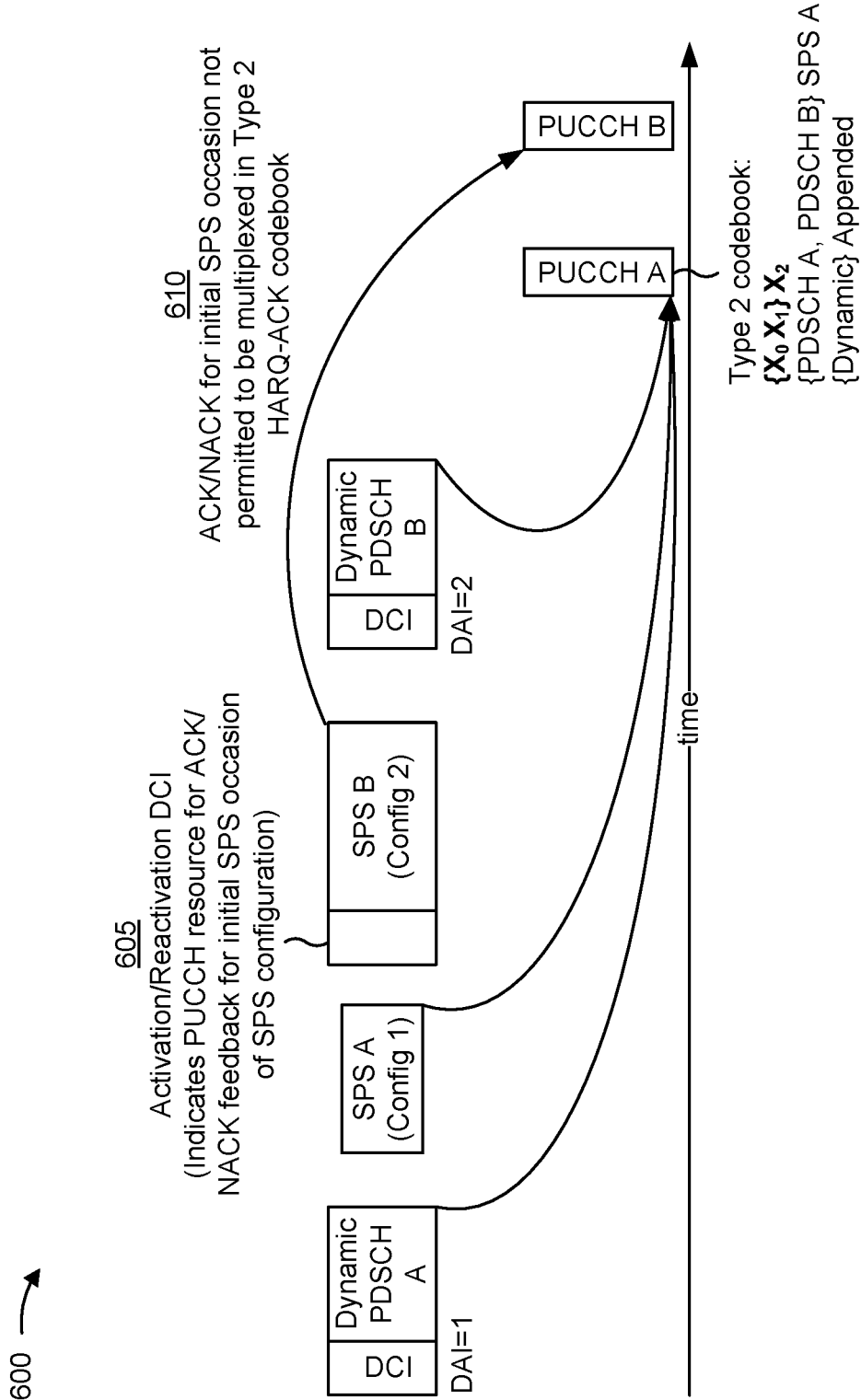

FIG. 6 is a diagram illustrating an example 600 of dynamic HARQ-ACK codebook construction for multiple active semi-persistent scheduling configurations, in accordance with various aspects of the present disclosure. In example 600, ACK/NACK feedback for an initial SPS occasion is not permitted to be multiplexed with ACK/NACK feedback for other SPS occasions and/or for PDSCH communications, in contrast with examples 400 and 500.

As shown by reference number 605, a UE 120 may receive, from a base station 110, activation (or reactivation) DCI for an SPS configuration. The activation DCI may indicate a PUCCH resource to be used to transmit ACK/NACK feedback for an initial SPS occasion of the SPS configuration. In example 600, the ACK/NACK feedback for the initial SPS occasion is not permitted to be multiplexed in a Type 2 HARQ-ACK codebook. In this case, the activation DCI may indicate a PUCCH resource in which ACK/NACK feedback, for communications other than the initial SPS communication, is not included.

For example, as shown by reference number 610, the activation DCI identifies PUCCH B for transmission of ACK/NACK feedback for the initial SPS occasion, while other ACK/NACK feedback (e.g., for SPS A, PDSCH A, and PDSCH B) are transmitted in PUCCH A. In this case, the UE 120 may use PUCCH B to transmit the ACK/NACK feedback for the initial SPS occasion to the base station 110. In this way, ambiguity and/or the use of many decoding hypotheses may be avoided when the UE 120 misses the activation DCI.

As indicated above, FIG. 6 is provided as an example. Other examples may differ from what is described with regard to FIG. 6.

Figure 7:
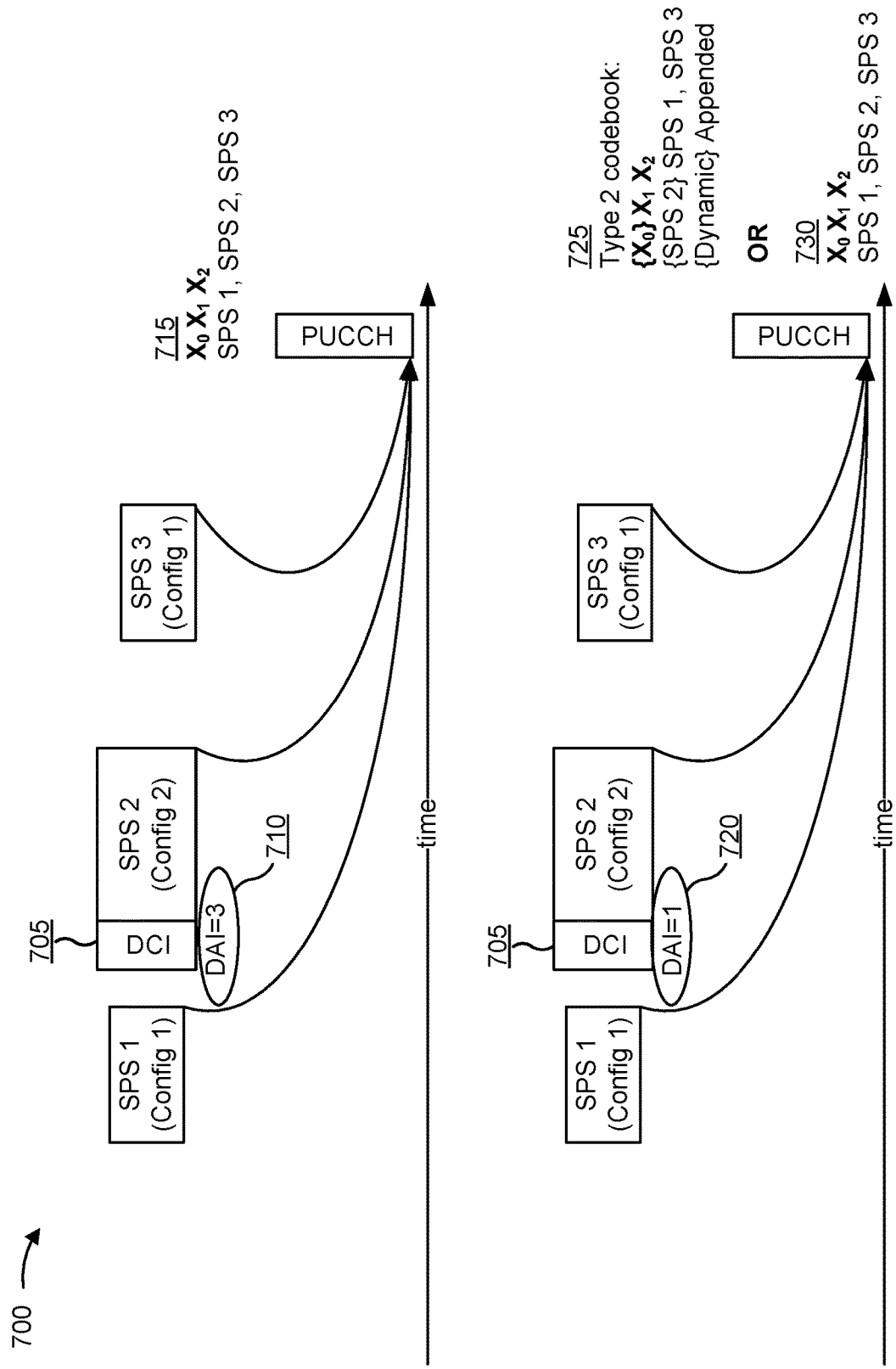

FIG. 7 is a diagram illustrating an example 700 of dynamic HARQ-ACK codebook construction for multiple active semi-persistent scheduling configurations, in accordance with various aspects of the present disclosure. In some aspects, the DAI indications and/or operations described in connection with FIG. 7 may be used when a UE 120 is operating in an SPS-only mode (e.g., when the UE 120 is configured or scheduled to receive only SPS communications and not dynamically-scheduled PDSCH communications, when all ACK/NACK feedback multiplexed in the same PUCCH communication is for SPS communications, when all PDSCHs for the UE 120 are SPS communications, when all PDSCHs for the UE 120 are configured by an RRC message, and/or the like).

As shown by reference number 705, a UE 120 may receive (e.g., from a base station 110) activation DCI (or reactivation DCI) for an SPS configuration. As shown by reference number 710, in some aspects, the activation DCI may include a DAI field that is incremented by a number of SPS occasions that are multiplexed in a same PUCCH communication regardless of an SPS configuration to which those SPS occasions belong. In example 700, the DAI field in this case is incremented by three to represent SPS 1 of a first SPS configuration, SPS 2 of a second SPS configuration (e.g., which is an initial SPS communication of the second SPS configuration and is activated by the activation DCI), and SPS 3 of the first SPS configuration. As shown by reference number 715, when the DAI field is incremented by a number of SPS occasions that are multiplexed in a same PUCCH communication regardless of an SPS configuration to which those SPS occasions belong, the location of ACK/NACK bits for those SPS occasions (shown as $X_0$, $X_1$, $X_2$) may follow an order in which the SPS occasions occur (shown as SPS 1, SPS 2, SPS 3). In some aspects, the ACK/NACK bits may not be transmitted in a Type 2 HARQ-ACK codebook.

Alternatively, as shown by reference number 720, the DAI field may be incremented for only an initial SPS configuration, and not for any other SPS communications for which ACK/NACK feedback is multiplexed with ACK/NACK feedback of the initial SPS configuration. In example 700, the DAI field in this case is incremented by one to represent SPS 2, which is an initial SPS communication of the second SPS configuration and is activated by the activation DCI. In this case, the DAI field is not incremented for either of SPS 1 and SPS 3, which are not initial SPS communications and which do not belong to the same SPS configuration as SPS 2. As shown by reference number 725, when the DAI field is incremented for only the initial SPS configuration, ACK/NACK feedback for the initial SPS communications (shown as $X_0$) may be included in a dynamic portion of the Type 2 HARQ-ACK codebook, and ACK/NACK feedback for the other SPS communications (shown as $X_1$ and $X_2$) may be appended to the dynamic portion of the Type 2 HARQ-ACK codebook. Alternatively, as shown by reference number 730, when the DAI field is incremented for only the initial SPS configuration, the location of ACK/NACK bits for the SPS occasions (e.g., $X_0$, $X_1$, $X_2$) may follow an order in which the SPS occasions occur (e.g., SPS 1, SPS 2, SPS 3), in a similar manner as described above in connection with reference number 715. In this case, the ACK/NACK bits may not be transmitted in a Type 2 HARQ-ACK codebook, in a similar manner as described above in connection with reference number 715.

In either case, the activation DCI may indicate a PUCCH resource (e.g., using a PUCCH resource indicator, or PRI) on which the ACK/NACK feedback for the SPS communications is to be multiplexed.

As indicated above, FIG. 7 is provided as an example. Other examples may differ from what is described with regard to FIG. 7.

Figure 8:
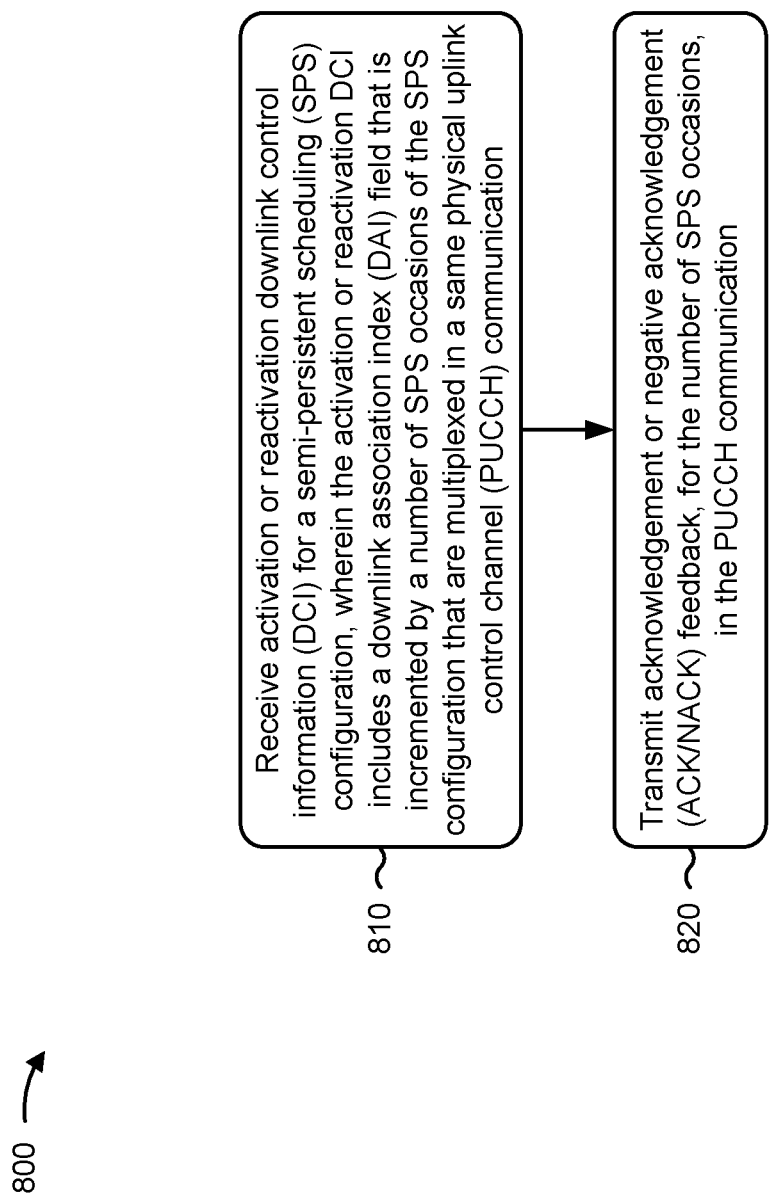
FIGS. 8-15 are diagrams illustrating example processes relating to dynamic HARQ-ACK codebook construction for multiple active semi-persistent scheduling configurations, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with dynamic HARQ-ACK codebook construction for multiple active SPS configurations.

As shown in FIG. 8, in some aspects, process 800 may include receiving activation or reactivation DCI for an SPS configuration, wherein the activation or reactivation DCI includes a DAI field that is incremented by a number of SPS occasions of the SPS configuration that are multiplexed in a same PUCCH communication (block 810). For example, the UE (e.g., using receive processor 258, controller/processor 280, memory 282, and/or the like) may receive activation or reactivation DCI for an SPS configuration, as described above. In some aspects, the activation or reactivation DCI includes a DAI field that is incremented by a number of SPS occasions of the SPS configuration that are multiplexed in a same PUCCH communication.

As further shown in FIG. 8, in some aspects, process 800 may include transmitting ACK/NACK feedback, for the number of SPS occasions, in the PUCCH communication (block 820). For example, the UE (e.g., using transmit processor 264, controller/processor 280, memory 282, and/or the like) may transmit ACK/NACK feedback, for the number of SPS occasions, in the PUCCH communication, as described above.

Process 800 may include additional aspects, such as any single aspect or any combination of aspects described below and/or in connection with one or more other processes described elsewhere herein.

In a first aspect, the number of SPS occasions includes an initial SPS occasion for the SPS configuration.

In a second aspect, alone or in combination with the first aspect, a number of bits, corresponding to the number of SPS occasions, are transmitted consecutively in the ACK/NACK feedback.

In a third aspect, alone or in combination with one or more of the first and second aspects, a number of bits of the ACK/NACK feedback, corresponding to the number of SPS occasions, are transmitted in a dynamic portion of a Type 2 HARQ-ACK codebook.

In a fourth aspect, alone or in combination with one or more of the first through third aspects, one or more bits of the ACK/NACK feedback, corresponding to one or more SPS occasions that are not configured by the SPS configuration and that are not an initial SPS occasion of a different SPS configuration, are appended to the dynamic portion of the Type 2 HARQ-ACK codebook.

In a fifth aspect, alone or in combination with one or more of the first through fourth aspects, one or more SPS occasions, of the SPS configuration, that are acknowledged or negatively acknowledged in a subsequent PUCCH communication, transmitted after the PUCCH communication, are appended to a dynamic portion of a Type 2 HARQ-ACK codebook in the subsequent PUCCH communication.

In a sixth aspect, alone or in combination with one or more of the first through fifth aspects, process 800 includes determining to multiplex the number of SPS occasions of the SPS configuration in the PUCCH communication based at least in part on an indication, in the activation or reactivation DCI or the SPS configuration, of the number of SPS occasions for which ACK/NACK feedback is to be multiplexed.

In a seventh aspect, alone or in combination with one or more of the first through sixth aspects, the ACK/NACK feedback for the number of SPS occasions is transmitted in the PUCCH communication based at least in part on a single physical downlink shared channel (PDSCH)-to-PUCCH timing value indicated in the activation or reactivation DCI.

In an eighth aspect, alone or in combination with one or more of the first through seventh aspects, the PDSCH-to-PUCCH timing value indicates a timing from a latest-occurring SPS occasion, of the number of SPS occasions, to the PUCCH communication.

In a ninth aspect, alone or in combination with one or more of the first through eighth aspects, the PDSCH-to-PUCCH timing value indicates a timing from an initial SPS occasion, of the number of SPS occasions, to the PUCCH communication.

In a tenth aspect, alone or in combination with one or more of the first through ninth aspects, the activation or reactivation DCI has DCI format 1_1 and DCI for SPS release also has DCI format 1_1.

In an eleventh aspect, alone or in combination with one or more of the first through tenth aspects, the number of SPS occasions of the SPS configuration for which the ACK/NACK feedback is permitted to be multiplexed in the PUCCH communication is limited to a maximum number of SPS occasions for which ACK/NACK feedback is permitted to be multiplexed in the PUCCH communication.

In a twelfth aspect, alone or in combination with one or more of the first through eleventh aspects, at least one of the maximum number of SPS occasions or the number of SPS occasions for which the ACK/NACK feedback is permitted to be multiplexed is configured according to a radio resource control message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
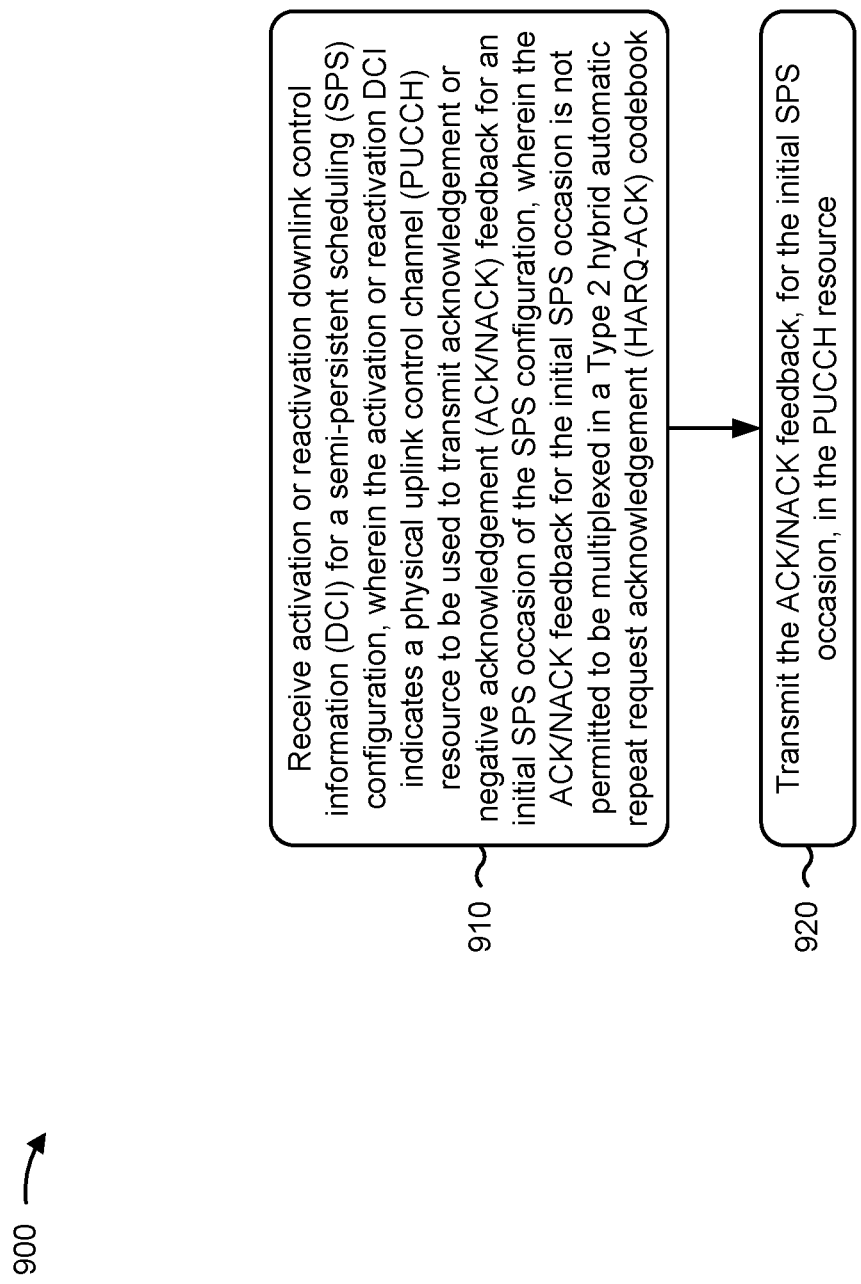

FIG. 9 is a diagram illustrating an example process 900 performed, for example, by a UE, in accordance with various aspects of the present disclosure. Example process 900 is an example where a UE (e.g., UE 120 and/or the like) performs operations associated with dynamic HARQ-ACK codebook construction for multiple active SPS configurations.

As shown in FIG. 9, in some aspects, process 900 may include receiving activation or reactivation DCI for an SPS configuration, wherein the activation or reactivation DCI indicates a PUCCH resource to be used to transmit ACK/NACK feedback for an initial SPS occasion of the SPS configuration, wherein the ACK/NACK feedback for the initial SPS occasion is not permitted to be multiplexed in a Type 2 HARQ-ACK codebook (block 910). For example, the UE (e.g., using receive processor 258, controller/processor 280, memory 282, and/or the like) may receive activation or reactivation DCI for an SPS configuration, as described above. In some aspects, the activation or reactivation DCI indicates a PUCCH resource to be used to transmit ACK/NACK feedback for an initial SPS occasion of the SPS configuration. In some aspects, the ACK/NACK feedback for the initial SPS occasion is not permitted to be multiplexed in a Type 2 HARQ-ACK codebook.

As further shown in FIG. 9, in some aspects, process 900 may include transmitting the ACK/NACK feedback, for the initial SPS occasion, in the PUCCH resource (block 920). For example, the UE (e.g., using transmit processor 264, controller/processor 280, memory 282, and/or the like) may transmit the ACK/NACK feedback, for the initial SPS occasion, in the PUCCH resource, as described above.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
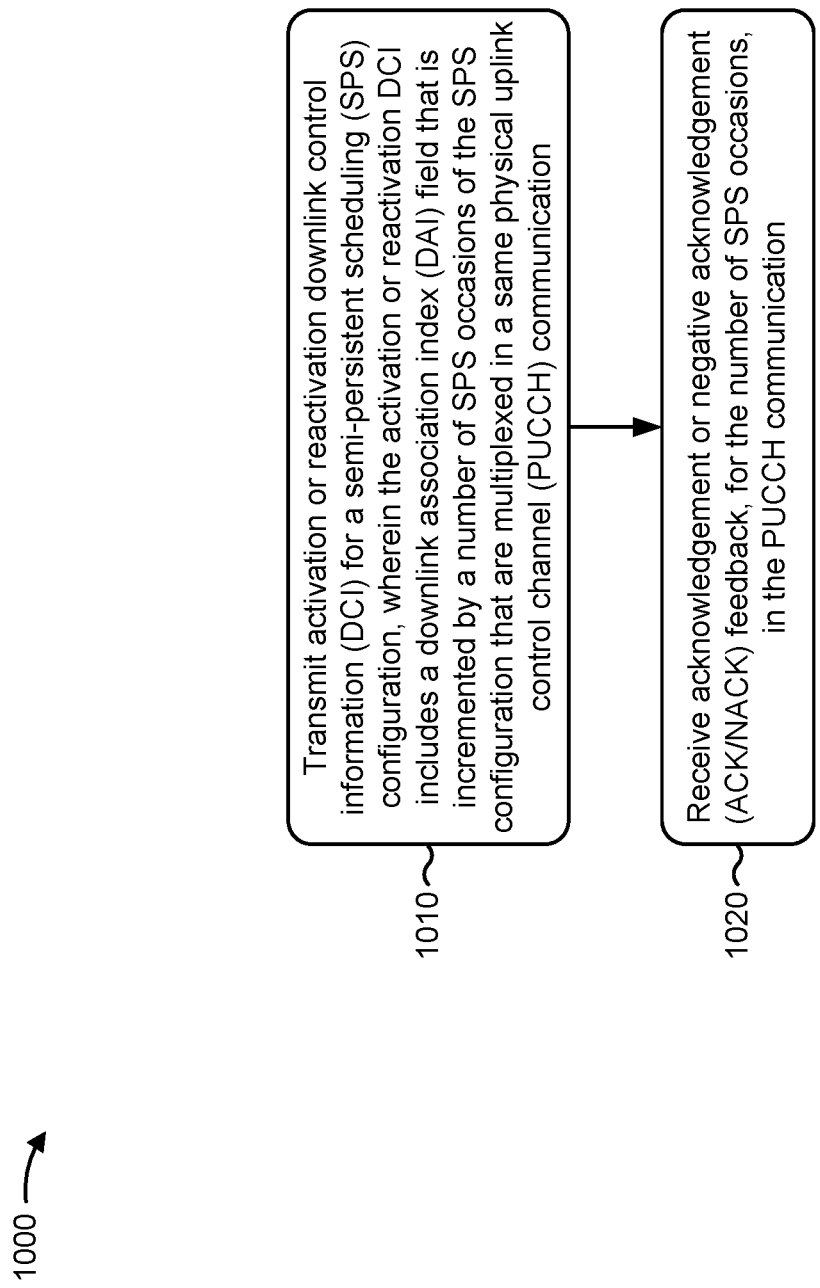

FIG. 10 is a diagram illustrating an example process 1000 performed, for example, by a base station, in accordance with various aspects of the present disclosure. Example process 1000 is an example where a base station (e.g., base station 110 and/or the like) performs operations associated with dynamic HARQ-ACK codebook construction for multiple active SPS configurations.

As shown in FIG. 10, in some aspects, process 1000 may include transmitting activation or reactivation DCI for an SPS configuration, wherein the activation or reactivation DCI includes a DAI field that is incremented by a number of SPS occasions of the SPS configuration that are multiplexed in a same PUCCH communication (block 1010). For example, the base station (e.g., using transmit processor 220, controller/processor 240, memory 242, and/or the like) may transmit activation or reactivation DCI for an SPS configuration, as described above. In some aspects, the activation or reactivation DCI includes a DAI field that is incremented by a number of SPS occasions of the SPS configuration that are multiplexed in a same PUCCH communication.

As further shown in FIG. 10, in some aspects, process 1000 may include receiving ACK/NACK feedback, for the number of SPS occasions, in the PUCCH communication (block 1020). For example, the base station (e.g., using receive processor 238, controller/processor 240, memory 242, and/or the like) may receive ACK/NACK feedback, for the number of SPS occasions, in the PUCCH communication, as described above.

Process 1000 may include additional aspects, such as any single aspect or any combination of aspects described below and/or in connection with one or more other processes described elsewhere herein.

In a first aspect, the number of SPS occasions includes an initial SPS occasion for the SPS configuration.

In a second aspect, alone or in combination with the first aspect, a number of bits, corresponding to the number of SPS occasions, are received consecutively in the ACK/NACK feedback.

In a third aspect, alone or in combination with one or more of the first and second aspects, a number of bits of the ACK/NACK feedback, corresponding to the number of SPS occasions, are received in a dynamic portion of a Type 2 HARQ-ACK codebook.

In a fourth aspect, alone or in combination with one or more of the first through third aspects, one or more bits of the ACK/NACK feedback, corresponding to one or more SPS occasions that are not configured by the SPS configuration and that are not an initial SPS occasion of a different SPS configuration, are appended to the dynamic portion of the Type 2 HARQ-ACK codebook.

In a fifth aspect, alone or in combination with one or more of the first through fourth aspects, one or more SPS occasions, of the SPS configuration, that are acknowledged or negatively acknowledged in a subsequent PUCCH communication, received after the PUCCH communication, are appended to a dynamic portion of a Type 2 HARQ-ACK codebook in the subsequent PUCCH communication.

In a sixth aspect, alone or in combination with one or more of the first through fifth aspects, process 1000 includes transmitting an indication to multiplex the number of SPS occasions of the SPS configuration in the PUCCH communication.

In a seventh aspect, alone or in combination with one or more of the first through sixth aspects, the ACK/NACK feedback for the number of SPS occasions is received in the PUCCH communication based at least in part on a single physical downlink shared channel (PDSCH)-to-PUCCH timing value indicated in the activation or reactivation DCI.

In an eighth aspect, alone or in combination with one or more of the first through seventh aspects, the PDSCH-to-PUCCH timing value indicates a timing from a latest-occurring SPS occasion, of the number of SPS occasions, to the PUCCH communication.

In a ninth aspect, alone or in combination with one or more of the first through eighth aspects, the PDSCH-to-PUCCH timing value indicates a timing from an initial SPS occasion, of the number of SPS occasions, to the PUCCH communication.

In a tenth aspect, alone or in combination with one or more of the first through ninth aspects, the activation or reactivation DCI has DCI format 1_1 and DCI for SPS release also has DCI format 1_1.

In an eleventh aspect, alone or in combination with one or more of the first through tenth aspects, the number of SPS occasions of the SPS configuration for which the ACK/NACK feedback is permitted to be multiplexed in the PUCCH communication is limited to a maximum number of SPS occasions for which ACK/NACK feedback is permitted to be multiplexed in the PUCCH communication.

In a twelfth aspect, alone or in combination with one or more of the first through eleventh aspects, at least one of the maximum number of SPS occasions or the number of SPS occasions for which the ACK/NACK feedback is permitted to be multiplexed is configured according to a radio resource control message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
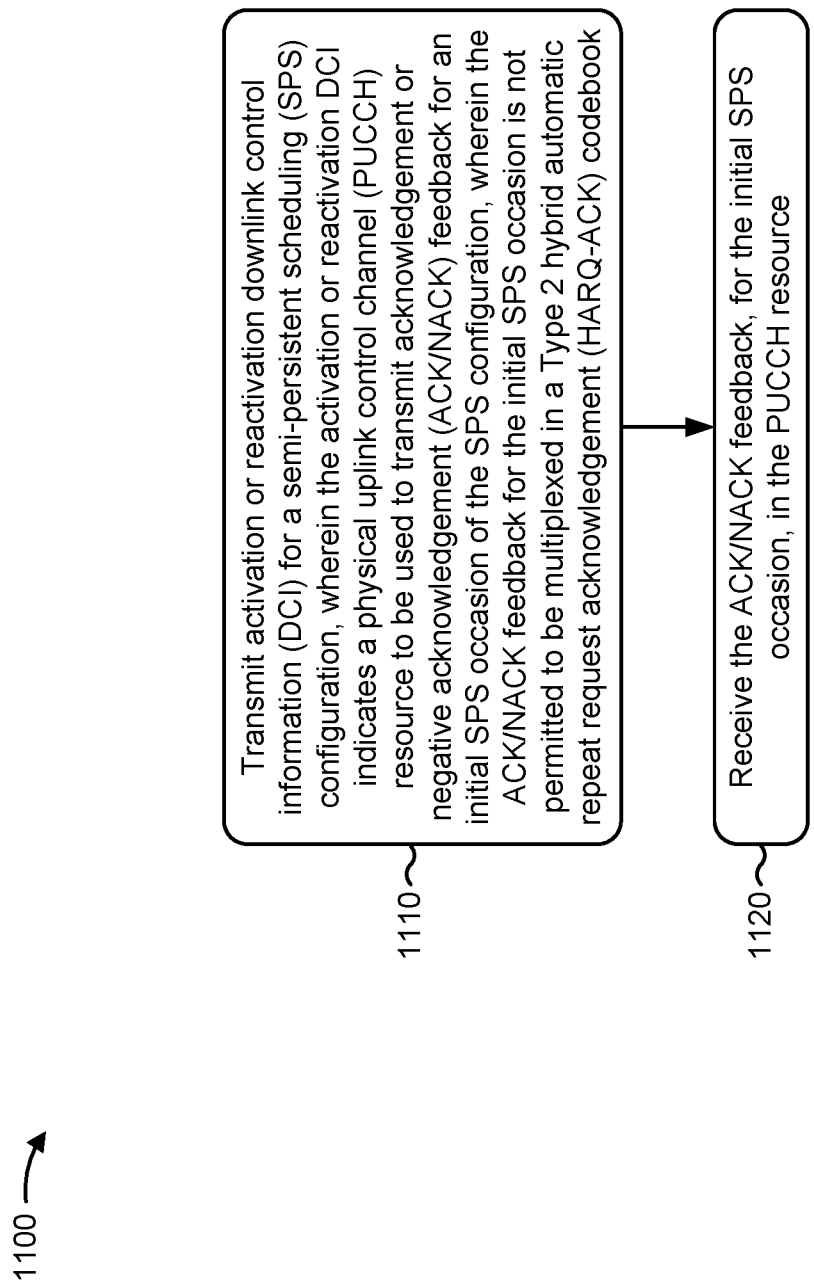

FIG. 11 is a diagram illustrating an example process 1100 performed, for example, by a base station, in accordance with various aspects of the present disclosure. Example process 1100 is an example where a base station (e.g., base station 110 and/or the like) performs operations associated with dynamic HARQ-ACK codebook construction for multiple active SPS configurations.

As shown in FIG. 11, in some aspects, process 1100 may include transmitting activation or reactivation DCI for an SPS configuration, wherein the activation or reactivation DCI indicates a PUCCH resource to be used to transmit ACK/NACK feedback for an initial SPS occasion of the SPS configuration, wherein the ACK/NACK feedback for the initial SPS occasion is not permitted to be multiplexed in a Type 2 HARQ-ACK codebook (block 1110). For example, the base station (e.g., using transmit processor 220, controller/processor 240, memory 242, and/or the like) may transmit activation or reactivation DCI for an SPS configuration, as described above. In some aspects, the activation or reactivation DCI indicates a PUCCH resource to be used to transmit ACK/NACK feedback for an initial SPS occasion of the SPS configuration. In some aspects, the ACK/NACK feedback for the initial SPS occasion is not permitted to be multiplexed in a Type 2 HARQ-ACK codebook.

As further shown in FIG. 11, in some aspects, process 1100 may include receiving the ACK/NACK feedback, for the initial SPS occasion, in the PUCCH resource (block 1120). For example, the base station (e.g., using receive processor 238, controller/processor 240, memory 242, and/or the like) may receive the ACK/NACK feedback, for the initial SPS occasion, in the PUCCH resource, as described above.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
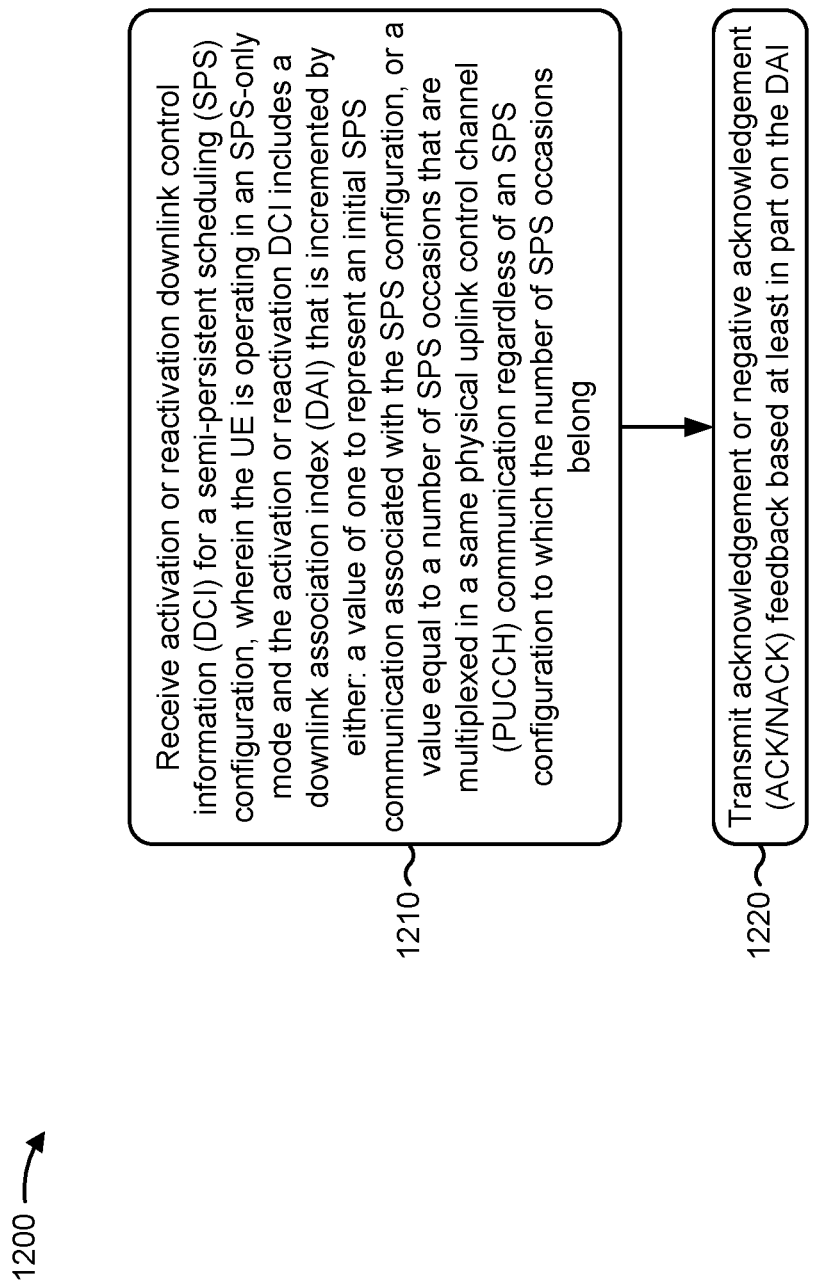

FIG. 12 is a diagram illustrating an example process 1200 performed, for example, by a UE, in accordance with various aspects of the present disclosure. Example process 1200 is an example where a UE (e.g., UE 120 and/or the like) performs operations associated with dynamic HARQ-ACK codebook construction for multiple active SPS configurations.

As shown in FIG. 12, in some aspects, process 1200 may include receiving activation or reactivation downlink control information (DCI) for a semi-persistent scheduling (SPS)

configuration, wherein the UE is operating in an SPS-only mode and the activation or reactivation DCI includes a downlink association index (DAI) that is incremented by either: a value of one to represent an initial SPS communication associated with the SPS configuration, or a value equal to a number of SPS occasions that are multiplexed in a same physical uplink control channel (PUCCH) communication regardless of an SPS configuration to which the number of SPS occasions belong (block 1210). For example, the UE (e.g., using receive processor 258, controller/processor 280, memory 282, and/or the like) may receive activation or reactivation downlink control information (DCI) for a semi-persistent scheduling (SPS) configuration a value of one to represent an initial SPS communication associated with the SPS configuration, as described above. In some aspects, the UE is operating in an SPS-only mode and the activation or reactivation DCI includes a downlink association index (DAI) that is incremented by either: a value of one to represent an initial SPS communication associated with the SPS configuration, or a value equal to a number of SPS occasions that are multiplexed in a same physical uplink control channel (PUCCH) communication regardless of an SPS configuration to which the number of SPS occasions belong.

As further shown in FIG. 12, in some aspects, process 1200 may include transmitting acknowledgement or negative acknowledgement (ACK/NACK) feedback based at least in part on the DAI (block 1220). For example, the UE (e.g., using transmit processor 264, controller/processor 280, memory 282, and/or the like) may transmit acknowledgement or negative acknowledgement (ACK/NACK) feedback based at least in part on the DAI, as described above.

Process 1200 may include additional aspects, such as any single aspect or any combination of aspects described below and/or in connection with one or more other processes described elsewhere herein.

In a first aspect, the DCI includes a PUCCH resource indicator to indicate a PUCCH resource in which the ACK/NACK feedback is to be transmitted.

In a second aspect, alone or in combination with the first aspect, the ACK/NACK feedback is transmitted in a Type 2 HARQ-ACK codebook.

In a third aspect, alone or in combination with the first aspect, the ACK/NACK feedback is not transmitted in a Type 2 HARQ-ACK codebook.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
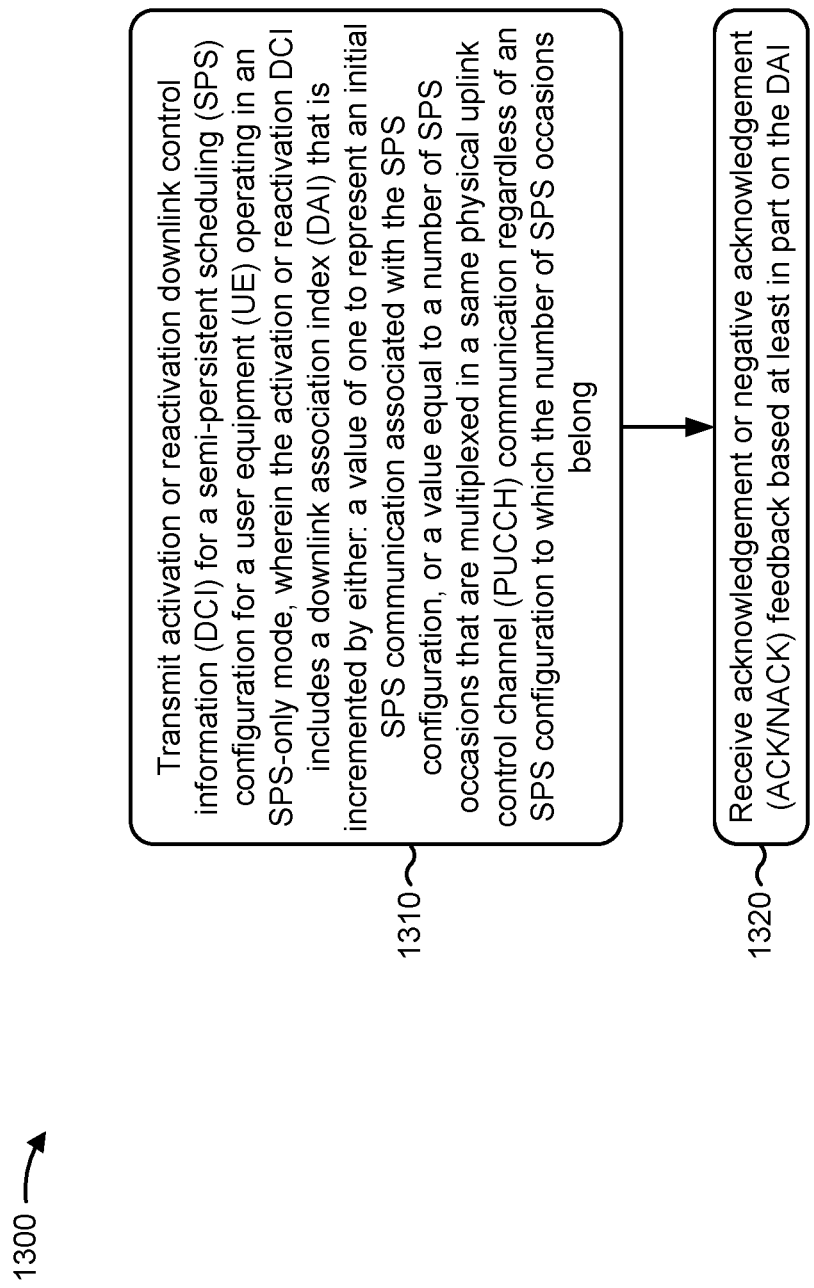

FIG. 13 is a diagram illustrating an example process 1300 performed, for example, by a base station, in accordance with various aspects of the present disclosure. Example process 1300 is an example where a base station (e.g., base station 110 and/or the like) performs operations associated with dynamic HARQ-ACK codebook construction for multiple active SPS configurations.

As shown in FIG. 13, in some aspects, process 1300 may include transmitting activation or reactivation DCI for an SPS configuration for a UE operating in an SPS-only mode, wherein the activation or reactivation DCI includes a downlink association index (DAI) that is incremented by either: a value of one to represent an initial SPS communication associated with the SPS configuration, or a value equal to a number of SPS occasions that are multiplexed in a same PUCCH communication regardless of an SPS configuration to which the number of SPS occasions belong (block 1310). For example, the base station (e.g., using transmit processor 220, controller/processor 240, memory 242, and/or the like) may transmit activation or reactivation DCI for an SPS configuration for a UE operating in an SPS-only mode, as described above. In some aspects, the activation or reactivation DCI includes a DAI that is incremented by either: a value of one to represent an initial SPS communication associated with the SPS configuration, or a value equal to a number of SPS occasions that are multiplexed in a same PUCCH communication regardless of an SPS configuration to which the number of SPS occasions belong.

As further shown in FIG. 13, in some aspects, process 1300 may include receiving ACK/NACK feedback based at least in part on the DAI (block 1320). For example, the base station (e.g., using receive processor 238, controller/processor 240, memory 242, and/or the like) may receive ACK/NACK feedback based at least in part on the DAI, as described above.

Process 1300 may include additional aspects, such as any single aspect or any combination of aspects described below and/or in connection with one or more other processes described elsewhere herein.

In a first aspect, the DCI includes a PUCCH resource indicator to indicate a PUCCH resource in which the ACK/NACK feedback is to be transmitted.

In a second aspect, alone or in combination with the first aspect, the ACK/NACK feedback is received in a Type 2 HARQ-ACK codebook.

In a third aspect, alone or in combination with the first aspect, the ACK/NACK feedback is not received in a Type 2 HARQ-ACK codebook.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
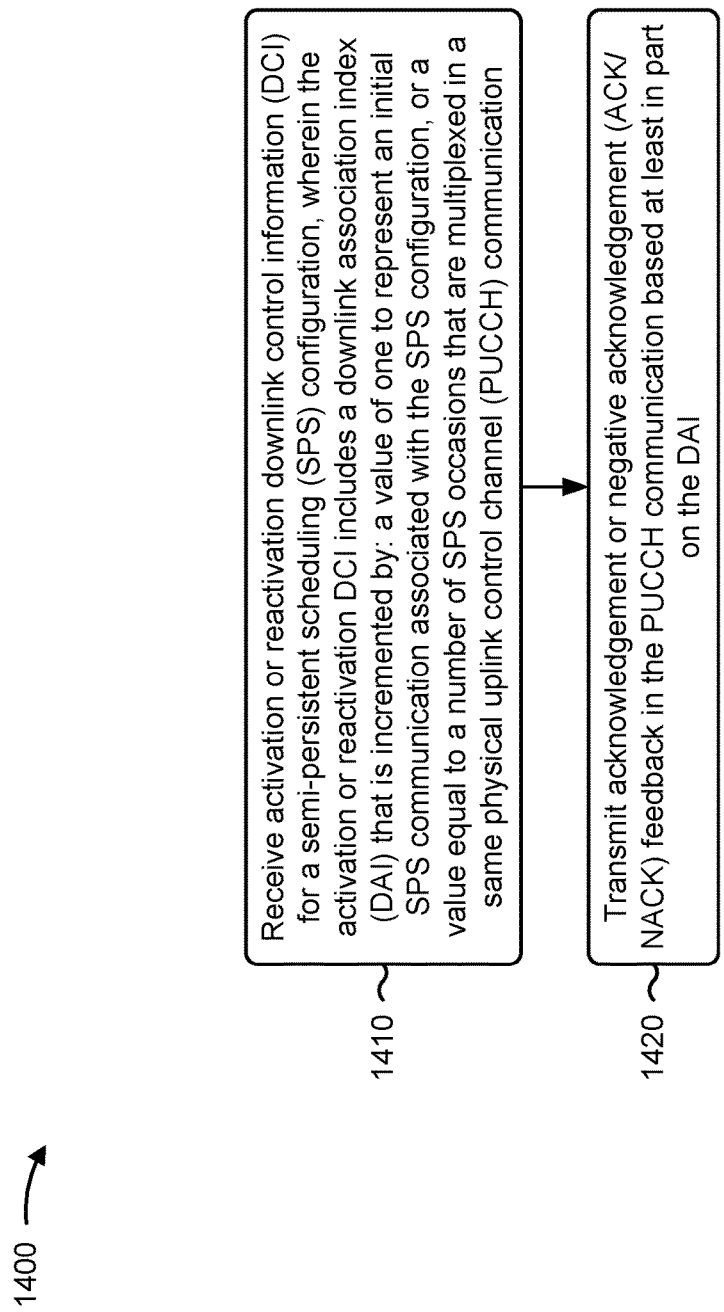

FIG. 14 is a diagram illustrating an example process 1400 performed, for example, by a UE, in accordance with various aspects of the present disclosure. Example process 1400 is an example where the UE (e.g., UE 120) performs operations associated with dynamic HARQ-ACK codebook construction for multiple active semi-persistent scheduling configurations.

As shown in FIG. 14, in some aspects, process 1400 may include receiving activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication (block 1410). For example, the UE (e.g., using antenna 252, demodulator 254, MIMO detector 256, receive processor 258, controller/processor 280, and/or memory 282) may receive activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication, as described above.

As further shown in FIG. 14, in some aspects, process 1400 may include transmitting ACK/NACK feedback in the PUCCH communication based at least in part on the DAI (block 1420). For example, the UE (e.g., using antenna 252, transmit processor 264, TX MIMO processor 266, modulator 254, controller/processor 280, and/or memory 282) may transmit ACK/NACK feedback in the PUCCH communication based at least in part on the DAI, as described above.

Process 1400 may include additional aspects, such as any single aspect or any combination of aspects described below and/or in connection with one or more other processes described elsewhere herein.

In a first aspect, the activation or reactivation DCI has DCI format 1_1 and DCI for SPS release also has DCI format 1_1.

In a second aspect, alone or in combination with the first aspect, the UE is operating in an SPS-only mode, the number of SPS occasions are multiplexed in the same PUCCH communication regardless of an SPS configuration to which the number of SPS occasions belong, and the DAI is incremented by either the value of one to represent the initial SPS communication associated with the SPS configuration, or the value equal to the number of SPS occasions that are multiplexed in the same PUCCH communication regardless of an SPS configuration to which the number of SPS occasions belong.

In a third aspect, alone or in combination with one or more of the first and second aspects, the DCI includes a PUCCH resource indicator to indicate a PUCCH resource in which the ACK/NACK feedback is to be transmitted.

In a fourth aspect, alone or in combination with one or more of the first through third aspects, the ACK/NACK feedback is transmitted in a Type 2 HARQ-ACK codebook.

In a fifth aspect, alone or in combination with one or more of the first through fourth aspects, the ACK/NACK feedback is not transmitted in a Type 2 HARQ-ACK codebook.

In a sixth aspect, alone or in combination with one or more of the first through fifth aspects, the number of SPS occasions are configured by the SPS configuration and the DAI is incremented by the value equal to the number of SPS occasions, of the SPS configuration, that are multiplexed in the same PUCCH communication.

In a seventh aspect, alone or in combination with one or more of the first through sixth aspects, the number of SPS occasions includes an initial SPS occasion for the SPS configuration.

In an eighth aspect, alone or in combination with one or more of the first through seventh aspects, a number of bits, corresponding to the number of SPS occasions, are transmitted consecutively in the ACK/NACK feedback.

In a ninth aspect, alone or in combination with one or more of the first through eighth aspects, a number of bits of the ACK/NACK feedback, corresponding to the number of SPS occasions, are transmitted in a dynamic portion of a Type 2 HARQ-ACK codebook.

In a tenth aspect, alone or in combination with one or more of the first through ninth aspects, one or more bits of the ACK/NACK feedback, corresponding to one or more SPS occasions that are not configured by the SPS configuration and that are not an initial SPS occasion of a different SPS configuration, are appended to the dynamic portion of the Type 2 HARQ-ACK codebook.

In an eleventh aspect, alone or in combination with one or more of the first through tenth aspects, one or more SPS occasions, of the SPS configuration, that are acknowledged or negatively acknowledged in a subsequent PUCCH communication, transmitted after the PUCCH communication, are appended to a dynamic portion of a Type 2 HARQ-ACK codebook in the subsequent PUCCH communication.

In a twelfth aspect, alone or in combination with one or more of the first through eleventh aspects, process 1400 includes determining to multiplex the number of SPS occasions of the SPS configuration in the PUCCH communication based at least in part on an indication, in the activation or reactivation DCI or the SPS configuration, of the number of SPS occasions for which ACK/NACK feedback is to be multiplexed.

In a thirteenth aspect, alone or in combination with one or more of the first through twelfth aspects, the ACK/NACK feedback for the number of SPS occasions is transmitted in the PUCCH communication based at least in part on a PDSCH-to-PUCCH timing value indicated in the activation or reactivation DCI.

In a fourteenth aspect, alone or in combination with one or more of the first through thirteenth aspects, the PDSCH-to-PUCCH timing value indicates a timing from a latest-occurring SPS occasion, of the number of SPS occasions, to the PUCCH communication.

In a fifteenth aspect, alone or in combination with one or more of the first through fourteenth aspects, the PDSCH-to-PUCCH timing value indicates a timing from an initial SPS occasion, of the number of SPS occasions, to the PUCCH communication.

In a sixteenth aspect, alone or in combination with one or more of the first through fifteenth aspects, the number of SPS occasions of the SPS configuration for which the ACK/NACK feedback is permitted to be multiplexed in the PUCCH communication is limited to a maximum number of SPS occasions for which ACK/NACK feedback is permitted to be multiplexed in the PUCCH communication.

In a seventeenth aspect, alone or in combination with one or more of the first through sixteenth aspects, at least one of the maximum number of SPS occasions or the number of SPS occasions for which the ACK/NACK feedback is permitted to be multiplexed is configured according to a radio resource control message.

In an eighteenth aspect, alone or in combination with one or more of the first through seventeenth aspects, the activation or reactivation DCI and the DCI for SPS release are received via a first carrier or a first cell, and the SPS configuration is for a second carrier or a second cell.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
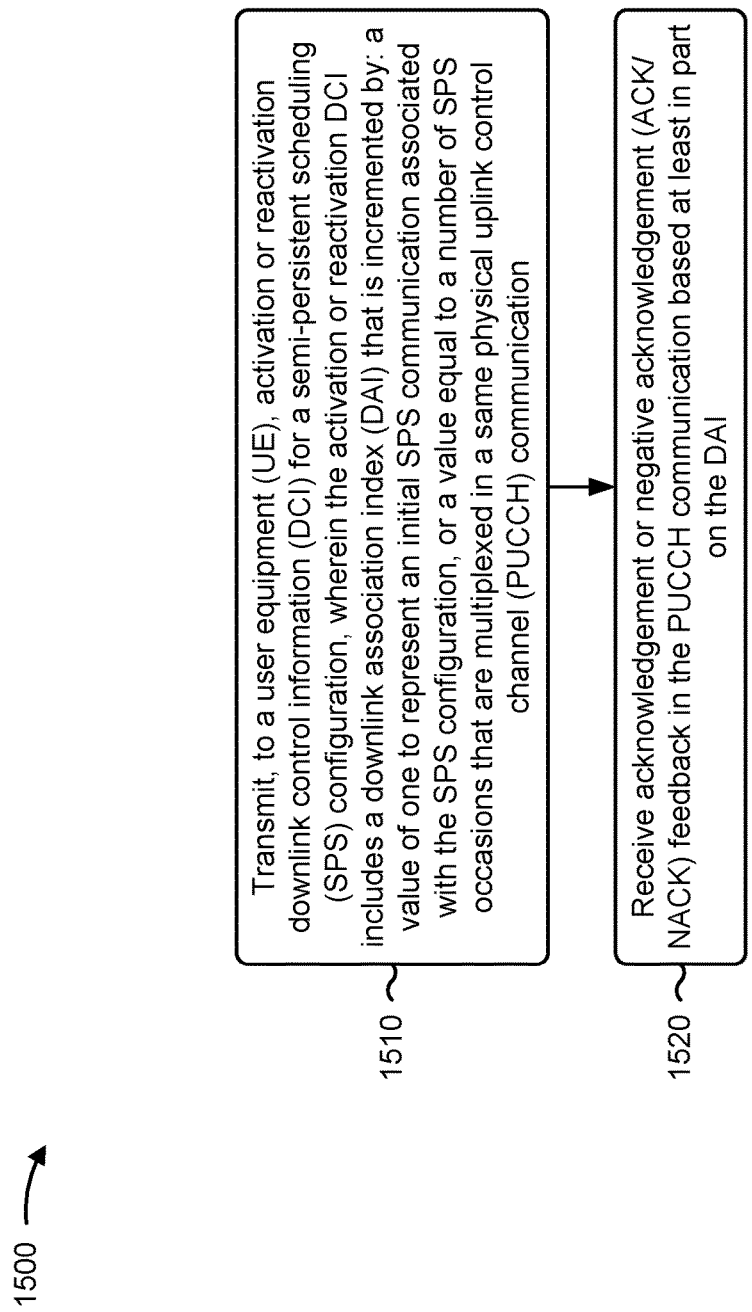

FIG. 15 is a diagram illustrating an example process 1500 performed, for example, by a base station, in accordance with various aspects of the present disclosure. Example process 1500 is an example where the base station (e.g., base station 110) performs operations associated with dynamic HARQ-ACK codebook construction for multiple active semi-persistent scheduling configurations.

As shown in FIG. 15, in some aspects, process 1500 may include transmitting, to a UE, activation or reactivation DC) for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication (block 1510). For example, the base station (e.g., using transmit processor 220, TX MIMO processor 230, modulator 232, antenna 234, controller/processor 240, memory 242, and/or scheduler 246) may transmit, to UE, activation or reactivation DCI for an SPS configuration, wherein the activation or reactivation DCI includes a DAI that is incremented by: a value of one to represent an initial SPS communication associated with the SPS configuration, or a value equal to a number of SPS occasions that are multiplexed in a same PUCCH communication, as described above.

As further shown in FIG. 15, in some aspects, process 1500 may include receiving ACK/NACK feedback in the PUCCH communication based at least in part on the DAI (block 1520). For example, the base station (e.g., using antenna 234, demodulator 232, MIMO detector 236, receive processor 238, controller/processor 240, and/or memory 242) may receive ACK/NACK feedback in the PUCCH communication based at least in part on the DAI, as described above.

Process 1500 may include additional aspects, such as any single aspect or any combination of aspects described below and/or in connection with one or more other processes described elsewhere herein.

In a first aspect, the activation or reactivation DCI has DCI format 1_1 and DCI for SPS release also has DCI format 1_1.

In a second aspect, alone or in combination with the first aspect, the UE is operating in an SPS-only mode, wherein the number of SPS occasions are multiplexed in the same PUCCH communication regardless of an SPS configuration to which the number of SPS occasions belong, and wherein the DAI is incremented by either the value of one to represent the initial SPS communication associated with the SPS configuration, or the value equal to the number of SPS occasions that are multiplexed in the same PUCCH communication regardless of an SPS configuration to which the number of SPS occasions belong.

In a third aspect, alone or in combination with one or more of the first and second aspects, the number of SPS occasions are configured by the SPS configuration and the DAI is incremented by the value equal to the number of SPS occasions, of the SPS configuration, that are multiplexed in the same PUCCH communication.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving activation or reactivation downlink control information (DCI) for a semi-persistent scheduling (SPS) configuration, wherein the activation or reactivation DCI includes a downlink association index (DAI) that is incremented by a value equal to a number of SPS occasions that are multiplexed in a same physical uplink control channel (PUCCH) communication; and
   transmitting acknowledgement or negative acknowledgement (ACK/NACK) feedback in the PUCCH communication,
   wherein a number of consecutive bits of the ACK/NACK feedback, corresponding to the SPS occasions, are based at least in part on the DAI, and
   wherein a number of appended bits of the ACK/NACK feedback, appended after the consecutive bits and corresponding to at least one of the SPS occasions, are based at least in part on whether the ACK/NACK feedback is for a non-initial SPS occasion.

2. The method of claim 1, wherein the activation or reactivation DCI has DCI format 1_1 and DCI for SPS release also has DCI format 1_1.

3. The method of claim 1, wherein the activation or reactivation DCI and the DCI for SPS release are received via a first carrier or a first cell, and wherein the SPS configuration is for a second carrier or a second cell.

4. The method of claim 1, wherein the UE is operating in an SPS-only mode, wherein a plurality of SPS occasions are multiplexed in the same PUCCH communication regardless of an SPS configuration to which the plurality of SPS occasions belong, and wherein the DAI is incremented by either:
  a value of one to represent an initial SPS communication associated with the SPS configuration, or
  the value equal to the number of SPS occasions that are multiplexed in the same PUCCH communication regardless of the SPS configuration to which the plurality of SPS occasions belong.

5. The method of claim 4, wherein the DCI includes a PUCCH resource indicator to indicate a PUCCH resource in which the ACK/NACK feedback is to be transmitted.

6. The method of claim 4, wherein the ACK/NACK feedback is transmitted in a Type 2 hybrid automatic repeat request acknowledgement (HARQ-ACK) codebook.

7. The method of claim 1, wherein the number of SPS occasions are configured by the SPS configuration and the DAI is incremented by the value equal to the number of SPS occasions, of the SPS configuration, that are multiplexed in the same PUCCH communication.

8. The method of claim 7, wherein the number of SPS occasions includes an initial SPS occasion for the SPS configuration.

9. The method of claim 7, wherein the number of consecutive bits correspond to the number of SPS occasions.

10. The method of claim 7, wherein the number of consecutive bits of the ACK/NACK feedback correspond to the number of SPS occasions and are transmitted in a dynamic portion of a Type 2 hybrid automatic repeat request acknowledgement (HARQ-ACK) codebook.

11. The method of claim 10, wherein the appended bits, corresponding to one or more SPS occasions that are not configured by the SPS configuration and that are not an initial SPS occasion of a different SPS configuration, are appended to the dynamic portion of the Type 2 HARQ-ACK codebook.

12. The method of claim 7, wherein one or more SPS occasions, of the SPS configuration, that are acknowledged or negatively acknowledged in a subsequent PUCCH communication, transmitted after the PUCCH communication, are appended to a dynamic portion of a Type 2 hybrid automatic repeat request acknowledgement (HARQ-ACK) codebook in the subsequent PUCCH communication.

13. The method of claim 7, further comprising determining to multiplex the number of SPS occasions of the SPS configuration in the PUCCH communication based at least in part on an indication, in the activation or reactivation DCI or the SPS configuration, of the number of SPS occasions for which ACK/NACK feedback is to be multiplexed.

14. The method of claim 7, wherein the ACK/NACK feedback for the number of SPS occasions is transmitted in the PUCCH communication based at least in part on a single physical downlink shared channel (PDSCH)-to-PUCCH timing value indicated in the activation or reactivation DCI.

15. The method of claim 14, wherein the PDSCH-to-PUCCH timing value indicates a timing from a latest-occurring SPS occasion, of the number of SPS occasions, to the PUCCH communication.

16. The method of claim 14, wherein the PDSCH-to-PUCCH timing value indicates a timing from an initial SPS occasion, of the number of SPS occasions, to the PUCCH communication.

17. The method of claim 7, wherein the number of SPS occasions of the SPS configuration for which the ACK/NACK feedback is permitted to be multiplexed in the PUCCH communication is limited to a maximum number of SPS occasions for which ACK/NACK feedback is permitted to be multiplexed in the PUCCH communication.

18. The method of claim 17, wherein at least one of the maximum number of SPS occasions or the number of SPS occasions for which the ACK/NACK feedback is permitted to be multiplexed is configured according to a radio resource control message.

19. A method of wireless communication performed by a base station, comprising:
  transmitting, to a user equipment (UE), activation or reactivation downlink control information (DCI) for a semi-persistent scheduling (SPS) configuration, wherein the activation or reactivation DCI includes a downlink association index (DAI) that is incremented by a value equal to a number of SPS occasions that are multiplexed in a same physical uplink control channel (PUCCH) communication; and
  receiving acknowledgement or negative acknowledgement (ACK/NACK) feedback in the PUCCH communication,
    wherein a number of consecutive bits of the ACK/NACK feedback, corresponding to the SPS occasions, are based at least in part on the DAI, and
    wherein a number of appended bits of the ACK/NACK feedback, appended after the consecutive bits and corresponding to at least one of the SPS occasions, are based at least in part on whether the ACK/NACK feedback is for a non-initial SPS occasion.

20. The method of claim 19, wherein the activation or reactivation DCI has DCI format 1_1 and DCI for SPS release also has DCI format 1_1.

21. The method of claim 19, wherein the UE is operating in an SPS-only mode, wherein a plurality of SPS occasions are multiplexed in the same PUCCH communication regardless of an SPS configuration to which the plurality of SPS occasions belong, and wherein the DAI is incremented by either:
  a value of one to represent an initial SPS communication associated with the SPS configuration, or
  the value equal to the number of SPS occasions that are multiplexed in the same PUCCH communication regardless of the SPS configuration to which the plurality of SPS occasions belong.

22. The method of claim 19, wherein the number of SPS occasions are configured by the SPS configuration and the DAI is incremented by the value equal to the number of SPS occasions, of the SPS configuration, that are multiplexed in the same PUCCH communication.

23. A user equipment (UE) for wireless communication, comprising:
  a memory; and
  one or more processors operatively coupled to the memory, the memory and the one or more processors configured to:
    receive activation or reactivation downlink control information (DCI) for a semi-persistent scheduling (SPS) configuration, wherein the activation or reactivation DCI includes a downlink association index (DAI) that is incremented by a value equal to a number of SPS occasions that are multiplexed in a same physical uplink control channel (PUCCH) communication; and
    transmit acknowledgement or negative acknowledgement (ACK/NACK) feedback in the PUCCH communication, wherein a number of consecutive bits of the ACK/NACK feedback, corresponding to the SPS occasions, are based at least in part on the DAI, and wherein a number of appended bits of the ACK/NACK feedback, appended after the consecutive bits and corresponding to at least one of the SPS occasions, are based at least in part on whether the ACK/NACK feedback is for a non-initial SPS occasion.

24. The UE of claim 23, wherein the activation or reactivation DCI has DCI format 1_1 and DCI for SPS release also has DCI format 1_1.

25. The UE of claim 23, wherein the UE is operating in an SPS-only mode, wherein a plurality of SPS occasions are multiplexed in the same PUCCH communication regardless of an SPS configuration to which the plurality of SPS occasions belong, and wherein the DAI is incremented by either:

a value of one to represent an initial SPS communication associated with the SPS configuration, or the value equal to the number of SPS occasions that are multiplexed in the same PUCCH communication regardless of the SPS configuration to which the plurality of SPS occasions belong.

26. The UE of claim 23, wherein the number of SPS occasions are configured by the SPS configuration and the DAI is incremented by the value equal to the number of SPS occasions, of the SPS configuration, that are multiplexed in the same PUCCH communication.

27. A base station for wireless communication, comprising:

a memory; and one or more processors operatively coupled to the memory, the memory and the one or more processors configured to:

transmit, to a user equipment (UE), activation or reactivation downlink control information (DCI) for a semi-persistent scheduling (SPS) configuration, wherein the activation or reactivation DCI includes a downlink association index (DAI) that is incremented by a value equal to a number of SPS occasions that are multiplexed in a same physical uplink control channel (PUCCH) communication; and receive acknowledgement or negative acknowledgement (ACK/NACK) feedback in the PUCCH communication, wherein a number of consecutive bits of the ACK/NACK feedback, corresponding to the SPS occasions, are based at least in part on the DAI, and wherein a number of appended bits of the ACK/NACK feedback, appended after the consecutive bits and corresponding to at least one of the SPS occasions, are based at least in part on whether the ACK/NACK feedback is for a non-initial SPS occasion.

28. The base station of claim 27, wherein the activation or reactivation DCI has DCI format 1_1 and DCI for SPS release also has DCI format 1_1.

29. The base station of claim 27, wherein the UE is operating in an SPS-only mode, wherein a plurality of SPS occasions are multiplexed in the same PUCCH communication regardless of an SPS configuration to which the plurality of SPS occasions belong, and wherein the DAI is incremented by either:

a value of one to represent an initial SPS communication associated with the SPS configuration, or the value equal to the number of SPS occasions that are multiplexed in the same PUCCH communication regardless of the SPS configuration to which the plurality of SPS occasions belong.

30. The base station of claim 27, wherein the number of SPS occasions are configured by the SPS configuration and the DAI is incremented by the value equal to the number of SPS occasions, of the SPS configuration, that are multiplexed in the same PUCCH communication.

* * * * *